US008023157B2

(12) United States Patent
Takahashi et al.

(10) Patent No.: US 8,023,157 B2
(45) Date of Patent: Sep. 20, 2011

(54) IMAGE DATA CORRECTING DEVICE FOR CORRECTING IMAGE DATA TO REMOVE BACK PROJECTION WITHOUT ELIMINATING HALFTONE IMAGE

(75) Inventors: Yuji Takahashi, Kanagawa (JP); Hiroyuki Kawamoto, Kanagawa (JP); Hiroaki Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 636 days.

(21) Appl. No.: 11/892,107

(22) Filed: Aug. 20, 2007

(65) Prior Publication Data
US 2008/0094647 A1 Apr. 24, 2008

Related U.S. Application Data

(63) Continuation of application No. 09/939,657, filed on Aug. 28, 2001, now Pat. No. 7,274,486.

(30) Foreign Application Priority Data

Sep. 4, 2000 (JP) .................................. 2000-266591

(51) Int. Cl.
*H04N 1/407* (2006.01)
*H04N 1/409* (2006.01)
*G06T 5/00* (2006.01)
*G03F 3/08* (2006.01)

(52) U.S. Cl. ....... 358/3.26; 358/3.24; 358/461; 358/521

(58) Field of Classification Search ................... 358/1.9, 358/3.06, 3.08, 3.14, 400, 452, 462, 3.24, 358/3.26, 461, 521; 382/176
See application file for complete search history.

(56) References Cited

U.S. PATENT DOCUMENTS

| 3,584,143 | A |   | 6/1971  | Gold et al.            |
|-----------|---|---|---------|------------------------|
| 4,194,221 | A |   | 3/1980  | Stoffel                |
| 5,235,436 | A | * | 8/1993  | Sakamoto et al. 358/462|
| 5,832,137 | A |   | 11/1998 | Knox                   |
| 5,995,658 | A |   | 11/1999 | Hanyu                  |
| 6,160,913 | A | * | 12/2000 | Lee et al. 382/176     |
| 6,285,470 | B1|   | 9/2001  | Matsuda et al.         |

FOREIGN PATENT DOCUMENTS

| EP | 0650288 | 4/1995 |
| EP | 0784396 | 7/1997 |

(Continued)

OTHER PUBLICATIONS

Patent Abstracts of Japan—vol. 1999, No. 04, Apr. 30, 1999 and JP 11027550 (Ricoh Co. Ltd), Jan. 29, 1999.

(Continued)

*Primary Examiner* — James A Thompson
(74) *Attorney, Agent, or Firm* — Dickstein Shapiro LLP

(57) ABSTRACT

An image data correcting device eliminates a back projection image without eliminating an image corresponding to a low-intensity halftone image. An intensity difference detection part detects an intensity difference between first image data corresponding to a part of a predetermined small area and second image data corresponding to the remaining parts of the predetermined small area. A halftone detection part determining whether the first image data corresponds to a halftone image. An intensity change part changes an intensity of the first image data to a predetermined low intensity, when the intensity difference is equal to or smaller than a first predetermined value and the first image data does not correspond to the halftone image and the intensity of the first image data is equal to or smaller than a second predetermined value.

12 Claims, 19 Drawing Sheets

FOREIGN PATENT DOCUMENTS

| | | |
|---|---|---|
| EP | 1154634 | 11/2001 |
| JP | 3-68270 | 3/1991 |
| JP | 07-264409 | 10/1995 |
| JP | 8-340447 | 12/1996 |
| JP | 9-116753 | 5/1997 |
| JP | 11-55524 | 2/1999 |

OTHER PUBLICATIONS

Patent Abstracts of Japan—vol. 2000, No. 10, Nov. 17, 2000 and JP 2000209438 (Fuji Xerox Co. Ltd), Jul. 28, 2000.

* cited by examiner

IMAGE INTENSITY OF FRONT SIDE AND BACKSIDE (a) IMAGE INTENSITY OF FRONT SIDE SHOW IN FIG.1A

FIG.13A

| a | b | c |
|---|---|---|
| d | e | f |
| g | h | i |

WHEN
$A1 < B$ AND
$A2 < B$ AND
$A3 < B$ AND
$A4 < B$ AND
$A5 < B$ AND
$A6 < B$ AND
$A7 < B$ AND
$A8 < B$ ,

ATTENTION PIXEL IS DETECTED AS FLAT,
AND C=1 IS SET

FIG.14A

FACTORS OF AVERAGING FILTER

| 1 | 1 | 1 | 1 | 1 | 1 | 1 | 1 | ÷ 8

66a

CALCULATE AVERAGE FOR EACH 8 PIXELS

FIG.14B

FACTORS OF
SMOOTHING FILTER

| 1 | 2 | 1 |
|---|---|---|
| 2 | 4 | 2 |
| 1 | 2 | 1 |

71a   ÷ 16

FIG.18
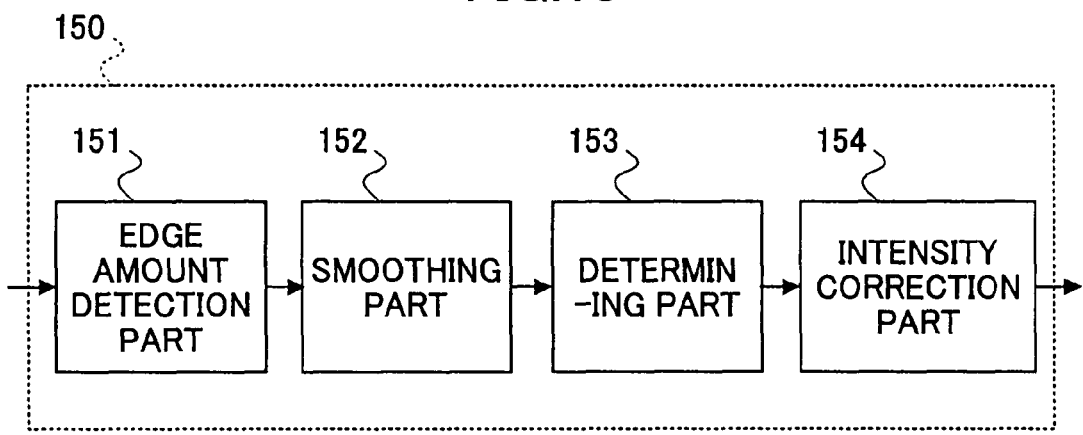
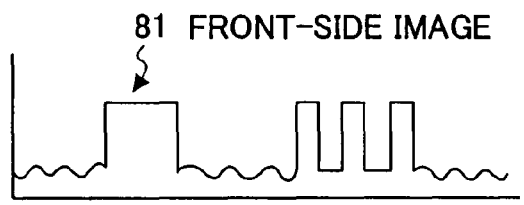
FIG.19A
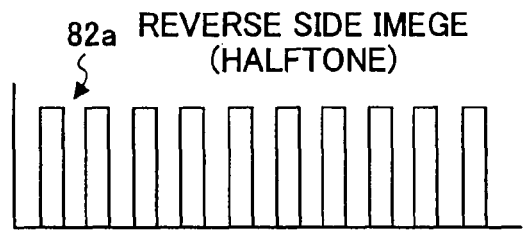
FIG.19B
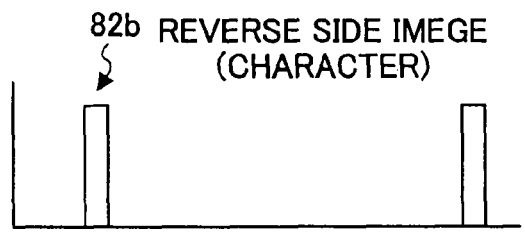
FIG.19C
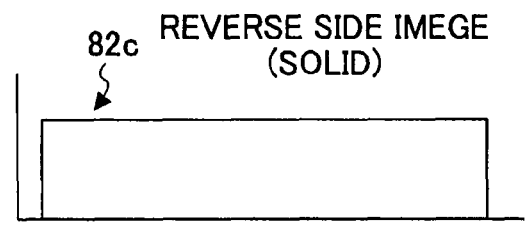
FIG.19D

FIG.20
$$L1 = \begin{bmatrix} & -1 & \\ -1 & +4 & -1 \\ & -1 & \end{bmatrix}$$
FIG.21A
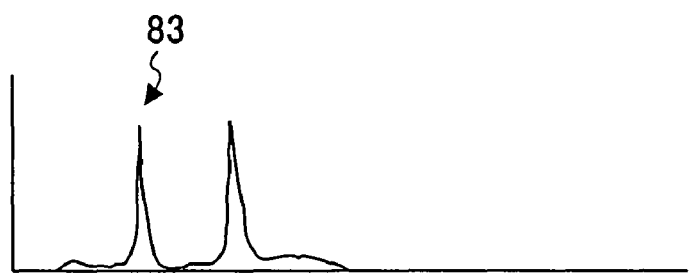
FIG.21B
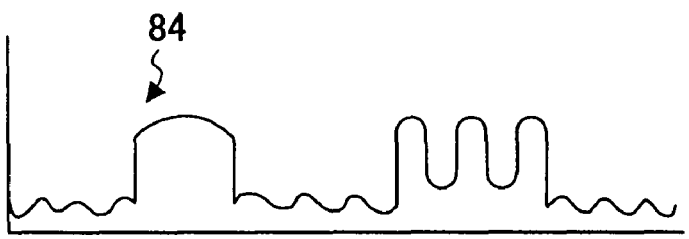
FIG.22
$$L2 = \begin{bmatrix} 1 & 1 & 1 & 1 & 1 \\ 1 & 1 & 1 & 1 & 1 \\ 1 & 1 & 2 & 1 & 1 \\ 1 & 1 & 1 & 1 & 1 \\ 1 & 1 & 1 & 1 & 1 \end{bmatrix} \times 1/26$$

IMAGE DATA CORRECTING DEVICE FOR CORRECTING IMAGE DATA TO REMOVE BACK PROJECTION WITHOUT ELIMINATING HALFTONE IMAGE

CROSS REFERENCE TO RELATED APPLICATIONS

This application is a continuation of U.S. patent application Ser. No. 09/939,657, filed on Aug. 28, 2001 now U.S. Pat. No. 7,274,486, which claims priority to Japanese Patent Application No. 2000-266591, filed on Sep. 4, 2000, the disclosures of which are hereby incorporated herein by reference in their entireties.

BACKGROUND OF THE INVENTION

1. Field of the Invention

The present invention generally relates to image forming apparatuses and, more particularly, to an image data correcting apparatus applicable to an image reading device or an image forming apparatus which can remove data corresponding to an image printed on a reverse side of a printed paper.

2. Description of the Related Art

When reading a both-side printed material such as newspaper, timetable, magazine, etc. by using a scanner or a copy machine, an image printed on a back side of the printed material may be undesirably read when reading an image on the front side of the printed material. Such a phenomenon is referred to as "back projection" or "reverse-side projection".

Japanese Laid-Open Patent Application No. 3-068270 discloses an image processing apparatus that detects low intensity image data and calculates an average value to be set as threshold value so that image data having an intensity value below the threshold value is changed to image data corresponding to white.

Japanese Laid-Open Patent Application No. 8-340447 discloses an image forming apparatus which comprises back projection area determining means, back projection level detecting means, back projection level correcting means and back projection level correction value storing means so as to eliminate an image caused by a back projection.

Japanese Laid-Open Patent Application No. 9-116753 discloses an image reading apparatus which eliminates an image corresponding to a backing by previously reading a surface of the backing and subtracting image data corresponding to the backing from image data obtained by reading a document.

Japanese Laid-Open Patent Application No. 11-055524 discloses an image forming apparatus which calculates MTF of image data, and obtains an average value of the MTF so as to determine that the image data corresponds to a back projection when the average value is below a setting value, and applies a background process to the image data.

The methods disclosed in Japanese Laid-Open Patent Application No. 3-068270 and Japanese Laid-Open Patent Application No. 9-116753 may cause a problem of degradation in reproducibility (fading) of a low-intensity character image and an intensity jump in a highlight portion of a photographic image.

In the image forming apparatus disclosed in the above-mentioned Japanese Laid-Open Patent Application No. 8-340447, since means for determining an area, in which back projection occurs, is provided, it is considered that the accuracy of detection of the area, in which the back projection occurs, must be high. In order to achieve such a high-accuracy detection, measures may be taken by performing pre-scanning or using character and picture separation algorithm. However, it is difficult to apply such a process to a relatively inexpensive apparatus and a high-speed machine, which requires real-time processing.

Besides, when performing elimination of back projection, there may be a case in which a low-intensity halftone image is eliminated since the low-intensity halftone image may be recognized as a back projection image.

A description will now be given, with reference to FIGS. 1A, 1B, 2A, 2B and 2C, of such a problem related to a low-intensity halftone image. FIG. 1A shows an example of image data obtained by reading a document of which both sides are printed. When viewing such a document from the front side, an image printed on the backside of the document may be visible due to transmission. In such a condition, the intensity of an image (back projection image) of the backside viewed from the front side is decreased, and an edge of the back projection image may be blunted, and data corresponding to such an image becomes that shown in FIG. 1B. The back projection image can be eliminated by changing data corresponding to the back projection image to a low intensity value corresponding to a background level (white). That is, if a difference in intensity within a small area of the document is below a setting value, the intensity distribution in the small area is regarded as flat, and, at this time, if the intensity of an image in the small area is below the setting value, the image is regarded as a back projection image.

However, in a case in which the image on the front side includes a low-intensity image such as a halftone image as shown in FIG. 2A, in particular, a color image, the halftone image may be recognized as a back projection image and is eliminated from image data to be reproduced as shown in FIG. 2C when an intensity difference of the halftone image is below a flat detection threshold value B as shown in FIG. 2B. This is because the intensity difference (calculated difference) between in a small area becomes that shown in FIG. 2B, and, therefore, the condition is established in which the image intensity is below the intensity threshold value E as shown in FIG. 2B and the intensity difference is below the flat detection threshold value B.

SUMMARY OF THE INVENTION

It is a general object of the present invention to provide an image data correcting device, an image reading device and an image forming apparatus in which the above-mentioned problems are eliminated.

A more specific object of the present invention is to eliminate a back projection image without eliminating an image corresponding to a low-intensity halftone image.

Another object of the present invention is to achieve the elimination of a back projection image by a single reading operation without using complicated algorithm.

A further object of the present invention is to reproduce a picture image without eliminating a low-intensity halftone image.

Still another object is to reduce a background fluctuation after elimination of a back projection image.

Yet another object is to prevent a crash of dots of a halftone image.

Another object of the present invention is to automatically prevent both a background fluctuation after elimination of a back projection image and a crash of dots of a halftone image.

In order to achieve the above-mentioned objects, there is provided according to one aspect of the present invention an image data correcting device comprising: detecting means for detecting an intensity difference between first image data corresponding to a part of a predetermined small area and second image data corresponding to the remaining parts of the predetermined small area; determining means for determining whether the first image data corresponds to a halftone image; and intensity changing means for changing an intensity of the first image data to a predetermined low intensity, when the intensity difference is equal to or smaller than a first predetermined value and the first image data does not correspond to the halftone image and the intensity of the first image data is equal to or smaller than a second predetermined value.

According to the above-mentioned invention, the intensity of the image data which does not correspond to a halftone image portion can be automatically changed to the predetermined low intensity when the intensity of the image data is equal to or smaller than the first predetermined value and the intensity difference of the image data within the predetermined small area is equal to or smaller than the second predetermined value since there is a high possibility that such image data is generated due to back projection. Since the change of intensity is not performed when the image data corresponds to a halftone image, the image data corresponding to a low intensity halftone image is not eliminated. Additionally, the elimination of a back projection image can be achieved by a single reading operation without using complicated algorithm. Further, a picture image can be reproduced without eliminating a low-intensity halftone image.

In the image data correcting device according to the present invention, the first predetermined value may be determined so that an intensity of at least a part of an image other than the halftone image is equal to or greater than the first predetermined value and an intensity of the halftone image is smaller than the first predetermined value.

Additionally, the second predetermined value may be determined so that a difference between a first intensity difference of the first image data is equal to or greater than the second predetermined value when the first image data corresponds to the halftone image, wherein the first intensity difference is a difference between the intensity of the first image data and an average in intensities of the first image data and the second image data.

In one embodiment of the present invention, the predetermined small area may be defined by a pixel matrix, and the first image data corresponds to one of pixels located in the center of the pixel matrix. The pixel matrix mat be a 3×3 matrix. The predetermined low intensity is equal to or smaller than an intensity of a background of an image from which the predetermined small area is extracted.

The image data correcting device according to the present invention may further comprise smoothing means for smoothing the first image data after the intensity of the first image data is changed. Additionally, the image data correcting device may further comprise selecting means for selecting whether to output the first image data before smoothing or after smoothing. The selecting means may select the first image data after smoothing when the first image data corresponds to an image other than the halftone image, and selects the first image data before smoothing when the first image data corresponding to the halftone image.

Additionally, there is provided according to another aspect of the present invention an image reading device comprising: scanning means for scanning an original document to obtain image data and converting the image data into digital form; and the above-mentioned image data correcting device.

Further, there is provided according to another aspect of the present invention an image forming apparatus comprises: the above-mentioned image reading device; the above-mentioned image data correcting device; and an image forming device forming a visible image based on the corrected image data supplied by the image data correcting device.

Other objects, features and advantages of the present invention will become more apparent from the following detailed description when read in conjunction with the accompanying drawings.

BRIEF DESCRIPTION OF THE DRAWINGS

FIG. 13A is an illustration showing a matrix of pixels used for computing an intensity difference; FIG. 13B is an illustration for explaining the calculation of the intensity difference; FIG. 13C is an illustration for explaining a condition to detect flatness;

FIG. 14A is an illustration for explaining a factor distribution for one-dimensional averaging used by an average computation part shown in FIG. 1e; FIG. 14B is an illustration for explaining a factor distribution of a smoothing process performed by a smoothing part shown in FIG. 12;

FIG. 18 is a block diagram of a back projection correction processing part, which detects a halftone image based on an edge amount;

FIGS. 19A, 19B, 19C, and 19D are illustrations showing examples of image data transmitted to the back projection correction processing part;

FIG. 20 is an illustration for explaining a Laplacian filter used for extracting an edge of an image;

FIG. 21A is a graph showing image data of a front side;

FIG. 21B is a graph showing smoothed image data corresponding to an image on a front side; and FIG. 22 is an illustration showing a structure of a smoothing filter.

DETAILED DESCRIPTION OF THE PREFERRED EMBODIMENTS

Figure 3:
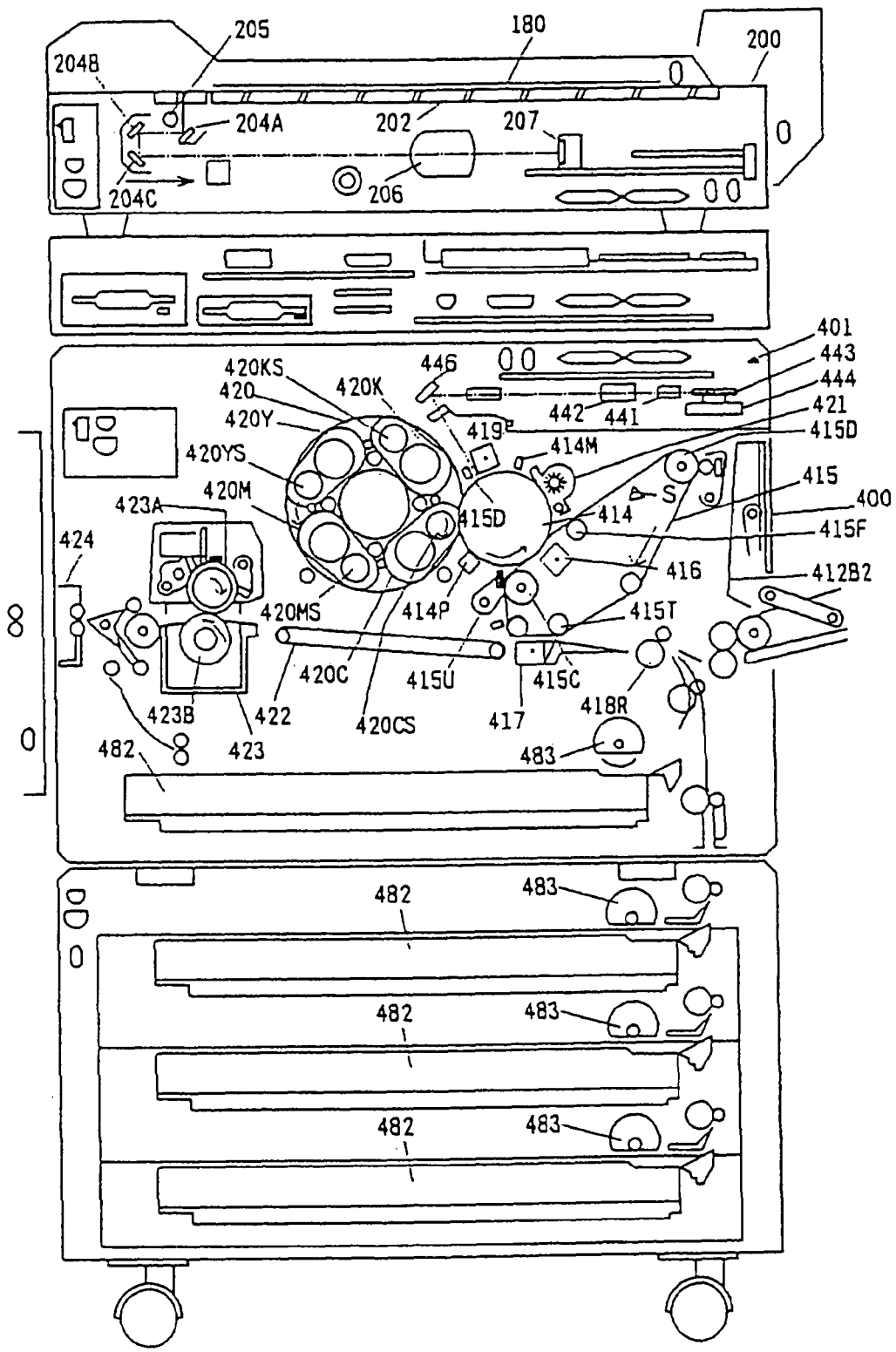
FIG. 3 is an illustration of an interior of an image forming apparatus according to a first embodiment of the present invention.

A description will now be given, with reference to the drawings, of a first embodiment of the present invention. FIG. 3 is an illustration of an interior of an image forming apparatus according to the first embodiment of the present invention. The image forming apparatus according to the present embodiment is a digital full-color copy machine.

In FIG. 3, a color image scanning device (hereinafter, referred to as a scanner) 200, which is an image reading device, scans a document placed on a contact glass 202 by a light emitted by an illumination lamp 105. The light is incident on a color sensor 207 through a group of mirrors 204A, 204B and 204C and a lens 206. The incident light is read by the color sensor 207 for each color spectrum such as, for example, blue (hereinafter abbreviated as B), green (hereinafter abbreviated as G) and red (hereinafter abbreviated as R), and is converted into electric image signals. The color sensor 207 is constituted by a 3-line CCD sensor, which can read B, G, R images on an individual color basis. The thus-obtained image data is subjected to a color conversion process by an image processing unit (not shown in the figure) based on a color resolution image signal intensity level of each B, G, R image data obtained by the scanner 200 so as to obtain color image data, which includes recording color information regarding black (hereinafter abbreviated as Bk), cyan (hereinafter abbreviated as C), magenta (hereinafter abbreviated as M) and yellow (hereinafter abbreviated as Y).

Using the thus-obtained color image data, images corresponding to Bk, C, M and Y are formed on an intermediate transfer belt in a superimposed state by a color image recording apparatus (hereinafter referred to as a color printer) 400, and the images are transferred onto a transfer paper. In the scanner 200, upon receipt of a scanner start signal synchronized with an operation timing of the color printer 400, an illumination/mirror optical system scans the document in a direction indicated by a leftward arrow so as to obtain image data corresponding to one color for each scan. Then, a latent image formed by the image data is developed on an individual color basis by the color printer 400, and the developed image is transferred onto the intermediate transfer belt in a superimposed state so as to form a full-color image consisting of four colors.

The color printer 400 includes a writing optical unit 401 as an exposure means. The writing optical unit 401 converts the color image data supplied by the scanner 200 into optical signals so as to perform optical writing corresponding the original image so as to form latent images on a photoconductive drum 414. The writing optical unit 401 comprises: a laser generating device 441; a light emission drive control part (not shown in the figure) which drives the laser generating device 441; a polygon mirror 443; a motor 444 for rotating the polygon mirror 443; an fθ lens 442; and reflective mirror 446. The photoconductive drum 414 rotates in the counterclockwise direction as shown by an arrow in the figure. A photo-conductor cleaning unit 421, a discharge lamp 414M, a charger 419, a potential sensor 414D which detects a latent image potential on the photoconductive drum, a selected developer of a revolver type development device 420, a development concentration pattern detector 414P and an intermediate transfer belt 415 are arranged around the photoconductive drum 141.

Revolver development equipment 420 comprises a BK-development machine 420K, a C-development machine 420C, an M-development machine 420M, a Y-development machine 420Y and a revolver rotation drive part (not shown in the figure) that rotates each development machine in a counterclockwise direction as indicated by an arrow. Each development machine comprises development sleeves 420KS, 420CS, 420MS and 420YS, which rotates with the ear of a development agent being contacted on the surface of the photoconductive drum 414, and a development paddle that rotates to scope up and agitate the development agent. In a standby state, the revolver development equipment 420 is set to a position at which a development is performed by the BK development vessel 420. When a copy operation is started, reading of BK image data by the scanner 200 starts at a predetermined timing, and the optical writing and latent image formation by a laser light is performed based on the image data. Hereafter, the latent image formed the BK image data is referred to as a BK latent image. The same process is performed also on each image data of C, M, and Y. In order to enable the development starting from the leading edge of the Bk latent image, before the leading edge of the latent image arrives at the development position of the Bk development machine 420K, the rotation of the development sleeve 420KS is started to rotate so as to develop the Bk latent image by a Bk toner. Thereafter, the development operation of the Bk latent image area is continued, and when the trailing edge of the latent image passes through the position of the Bk latent image, the revolver development equipment 420 is driven to rotate promptly from the development position by the Bk development machine 420K to a development position of a development machine of the subsequent color. This rotating operation is made to complete at least before the leading edge of the subsequent image data reaches.

If the formation cycle of an image is started, the photoconductive drum 414 is rotated in a counterclockwise direction as indicated by an arrow. The intermediate transfer belt 415 is rotated in a clockwise direction by the drive motor (not shown in the figure). In connection with the rotation of the intermediate transfer belt 415, BK toner image formation, C toner image formation, M toner image formation, and Y toner image formation are performed one by one.

Finally, a toner image is formed on the intermediate transfer belt 415 in a superimposed state in the order of BK, C, M and Y. The formation of the BK image is performed as follows. First, a charger 419 uniformly charges the photoconductive drum 414 by a corona electric discharge at a minus electric charge of about −700 V. Thereafter, a laser diode 441 performs raster exposure based on the Bk signal. Thus, when a raster image is exposed, the electric charge proportional to an amount of exposure light disappears in the exposed portion of the photoconductive drum 414 which is charged uniformly at the beginning, and an electrostatic latent image is formed as a result. The toner in revolver development apparatus 420 is charged in negative polarity by agitation by a ferrite career. Moreover, the BK development sleeve 420KS of the present development apparatus is biased at a potential which is a combination of a negative direct-current potential and an alternating current by a power supply circuit (not shown) to a metal base layer of the photoconductive drum 414. Consequently, the toner does not adhere to the portion in which the electric charge of the photoconductive drum 414 remains, and a portion without an electric charge, i.e., the exposed portion, adsorbs the Bk toner. Thereby, a Bk visible image identical to the latent image is formed. The intermediate transfer belt 415 is engaged with a drive roller 415D, a transfer opposite roller 415T, a cleaning opposite roller 415C and a group of idle rollers, and is driven to rotate by a drive motor (not shown in the figure).

Bk toner image formed on the photoconductive drum 414 is transferred onto the surface of the intermediate transfer belt 415, which is moving at a constant speed while contacting the photoconductive drum 414, by a belt transfer corona discharger (hereinafter referred to as a belt transfer part) 416. Hereafter, transfer of the toner image from the photoconductive drum 414 to the intermediate transfer belt 415 is referred to as a belt transfer. In order to prepare for re-use of the photoconductive drum 414, a slight amount of the non-transferred remaining toner on the photoconductive drum 414 is cleaned by a photo conductor cleaning unit 421.

The collected toner is stored in a waste toner tank (not shown) via a recovery pipe.

In addition, a belt transfer picture of 4 color piles is formed on the same side of the intermediate transfer belt 415 by sequentially positioning the toner images of Bk, C, M and Y, which are sequentially formed on the photoconductive drum 414. Then, the belt transfer picture is transferred onto a transfer paper by a corona discharge transfer unit. Meanwhile, on the photoconductive drum 414 side, after the formation process of the BK picture is completed, the formation process of the C picture is performed. That is, reading of the C image data by the scanner 200 starts at a predetermined timing, and the C latent image is formed by the laser light writing based on the image data. In the development position; after the trailing edge of the Bk latent image passed and before the leading edge of the C latent image reaches, the C development apparatus 420C performs a rotating operation of the revolver development device so as to develop the C latent image by a C toner. Although the development of the C latent image area is continued thereafter, the revolver development apparatus 420 is driven to send out the C development apparatus 420C when the trailing edge of the latent image passes, similar to the case of above-mentioned Bk development apparatus.

Then, the following M development apparatus 420M is located in the development position.

This operation is also carried out before the leading edge of the following M latent image reaches the development part. It should be noted that, in the formation process of each image of M and Y, an operation of reading the image data, latent image formation, and development thereof is the same as that of the process of the above-mentioned Bk image and C image, and descriptions thereof will be omitted.

The belt cleaning device 415U comprises an entrance seal, a rubber plate, a discharge coil and a contact separation mechanism for the entrance seal and the rubber plate. While carrying out belt transfer of the image of the second, third and fourth color after carrying out belt transfer of the Bk picture of the first color, the entrance seal, the rubber plate, etc. are separated from the intermediate transfer belt by the blade contact separation mechanism. A paper transfer corona-discharger (hereinafter, referred to as a paper transfer unit) 417 applies AC+DC or DC component to a transfer paper and the intermediate transfer belt 415 by the corona discharge system in order to transfer the superimposed toner image on the intermediate transfer belt 415 onto the transfer paper.

Transfer papers of various sizes are contained in transfer paper cassettes 482 in a feed bank.

Transfer papers are fed and conveyed by feed rollers 483 in a direction of a register roller pair 418R from one of the cassettes which contains the paper of the designated size.

In addition, a paper tray 412 B-2 is provided for manually feeding an OHP paper, a thick paper, etc. The transfer paper is fed from one of the paper trays by the time when the picture formation is started, and the transfer paper stands by in the nip part of register roller pair 418R. Then, when the leading edge of the toner image on the intermediate transfer belt 415 reaches the paper transfer unit 417, the register roller pair 418R is driven so that the front end of the transfer paper is aligned with the leading edge of the toner image, thereby achieving positioning of the transfer paper and the toner image. Thus, transfer paper overlaps with the superimposed color image on the intermediate transfer belt 415, and passes through the paper transfer unit 417 connected to a positive potential. At this time, the transfer paper is charged by the positive electric charge by a corona discharge current, and a large part of the toner image is transferred onto the transfer paper. Then, when the transfer paper passing a separation discharger constituted by a discharge brush (not shown) arranged on the left-hand side of the paper transfer unit 417, the transfer paper is discharged and exfoliated from the intermediate transfer belt 415, and moves to a paper conveyance belt 422. The transfer paper on which the 4 color superimposed toner image has been transferred from the surface of the intermediate transfer belt is conveyed to a fixing unit 423 by the paper conveyance belt 422. In the fixing unit 423, the toner image of the transfer paper is melted and fixed in the nip part formed by a pressing roller 423B and a fixing roller 423A, which is controlled at a predetermined temperature.

Thereafter, the transfer paper is sent out of a main body by a discharge roller pair 424, and is stacked in a copy tray (not shown) in a face-up state.

In addition, the surface of the photo conductor drum 414 after the belt transfer is carried out is cleaned by a photoconductor cleaning unit 421 which consists of a brush roller, a rubber blade, etc. Moreover, the photoconductive drum 414 is uniformly discharged by a discharge lamp 414M. Additionally, the surface of the intermediate transfer belt 415 after transferring the toner image onto the transfer paper is cleaned again by being pressed by the blade contact separation mechanism of the cleaning unit 415U. In a repeat copy, the operation of the scanner and the image formation on the photoconductor proceed to a first color image forming process of the second sheet at a predetermined timing subsequent to the fourth color image forming process of the first sheet. On the other hand, subsequent to the transfer of the 4-color superimposed image onto the transfer paper, the Bk toner image of the second sheet is transferred in an area cleaned by a belt-cleaning device on the surface of the intermediate transfer belt 415. After that, the same operation as the first sheet is performed.

The color copy machine shown in FIG. 3 is provided with a compound function. That is, the color copy machine shown in FIG. 3 can print out print data by the color printer 400 when the print data is supplied through LAN or parallel I/F from a host such as a personal computer. Additionally, the color copy machine can also transmit the image data read by the scanner 200 to a remote facsimile machine. Moreover, the color copy machine can also print out received image data. The copy machine is connected to a public telephone network through a yard switchboard PBX, and is capable of communicating with a remote facsimile machine or a management server of a service center through the public telephone network.

Figure 4:
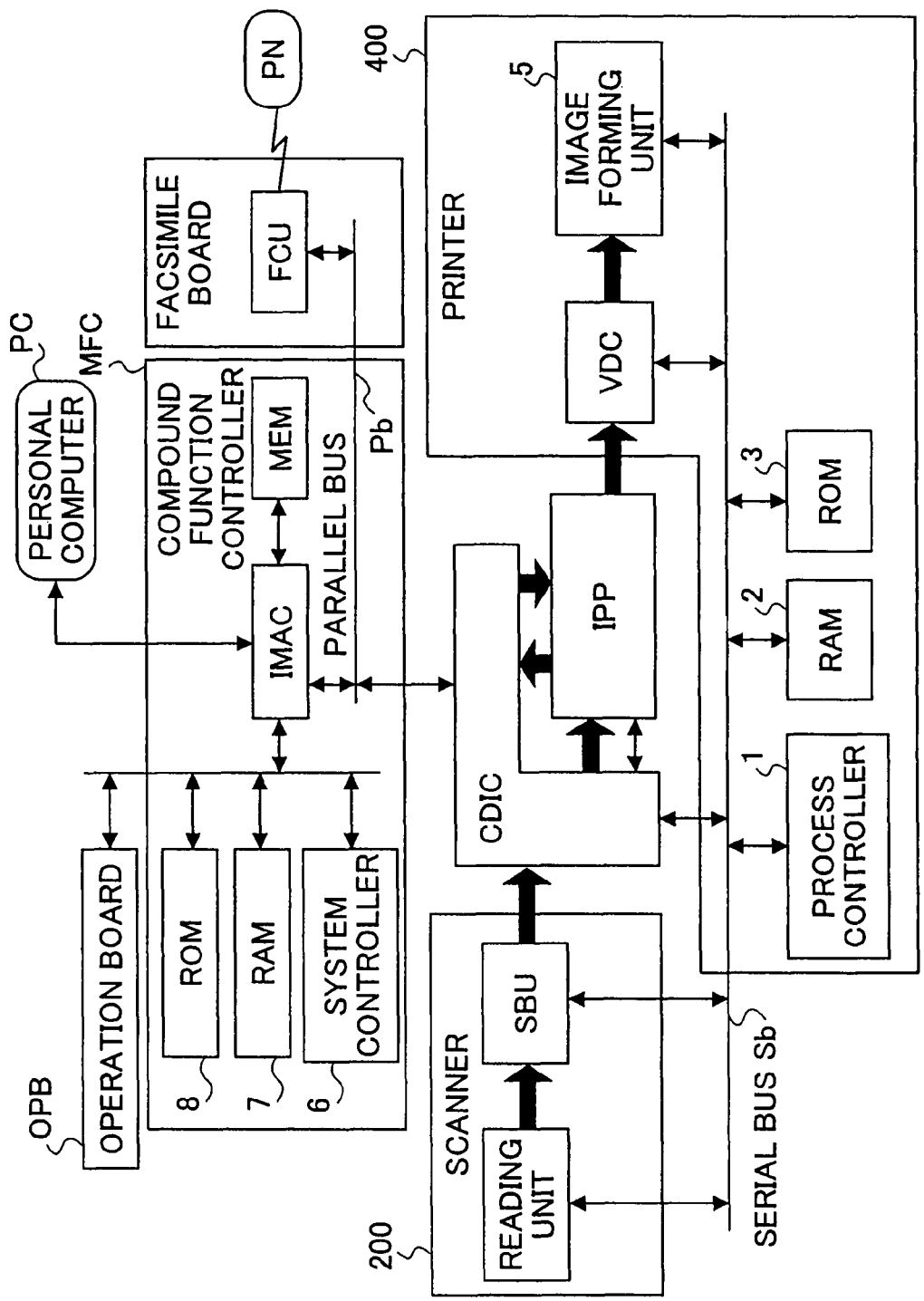
FIG. 4 is a block diagram of an electric system of the copy machine shown in FIG. 3.

FIG. 4 shows the electric system of the copy machine shown in FIG. 3. The scanner 200, which reads an original document, optically condenses the light of the lamp irradiation reflected by the original document on a light-receiving element 207 by mirrors and lenses in the reading unit 4. The light-receiving element (CCD in the present embodiment) is provided in a sensor board unit (hereinafter abbreviated as SBU). The image signal changed into the electric signal by the CCD is converted into a digital signal, i.e., the read image data, by SBU. Then, the converted image signal is output from SBU to a compression/decompression data interface control part (hereinafter, abbreviated as CDIC).

That is, the image data output from SBU is input to CDIC. CDIC controls transmission of the image data between functional devices and a data bus. That is, CDIC controls the data transmission between SBU, a parallel bus Pb and an image-signal processing device (hereinafter abbreviates as IPP) with respect to the image data. Moreover, CDIC controls the image data transmission between the system controller 6, which manages the control of the whole digital copy machine shown in FIG. 4, and the process controller 1. Furthermore, CDIC performs communication with respect to other controls. The system controller 6 and the process controller 1 communicate mutually through the parallel bus Pb, CDIC and a serial bus Sb. CDIC performs data format conversion for the data interface of the parallel bus Pb and the serial bus Sb in inside thereof.

The read image data from SBU is transmitted to IPP via CDIC. IPP corrects signal degradation (signal degradation of a scanner system: distortion of the reading image data based on the scanner characteristic) in association with the quantization to an optical system and a digital signal, and outputs the corrected image data to CDIC again. CDIC transmits the image data to a copy function controller MFC, and writes the image data in a memory MEM. Alternatively, the image data is returned to the processing system for the printer output by IPP.

That is CDIC has a job for accumulating the read image data in the memory MEM so as to reuse the accumulated data and a job for outputting the read image data to a video data control (hereafter, referred to as VDC) without accumulating the read image data in the memory MEM and outputting an image by the laser printer 400. As an example of accumulating in the memory MEM, there is a case where a plurality of copies are made from one original document. That is, the reading unit 4 is operated only once so as to accumulate the read image data in the memory MEM, and the accumulated data is read for a plurality of times. As an example of not using the memory MEM, there is a case where one sheet of original document is copied only once. That is, since what is necessary is just to process the read image data for a printer output as it is, it is not necessary to perform the writing in the memory MEM.

When not using the memory MEM, the image data transmitted to CDIC from IPP is again returned to IPP from CDIC. Image quality processing (15 of FIG. 5) is performed for changing the intensity data obtained by CCD into area gradation in IPP. The image data after the image quality processing is transmitted to VDC from IPP. Pulse control is performed by the VDC for the post-processing with respect to dot arrangement and reproducing the dots so as to form a reproduced image on a transfer paper in the image forming unit 5 of the laser printer 400.

When performing additional processing, for example, rotation of an image, composition of an image, etc. to the image data accumulated in the memory MEM at the time of reading from the memory MEM, the data transmitted to CDIC from IPP is sent to an image memory access control (hereinafter abbreviates as IMAC) from CDIC via the parallel bus Pb.

Based on the control of the system controller 6, IMAC performs an access control of the memory module MEM (hereinafter abbreviated as MEM), deployment (character code/character bit conversion) of data for a print of an external personal computer (hereinafter, abbreviated as PC), and compression/decompression of image data for effective use. The data sent to IMAC is accumulated, after being compressed, to MEM, and the accumulated data is read if needed. After being decompressed, the data read from MEM is returned to the original image data, and is sent back from IMAC to CDIC via the parallel bus Pb.

After transmitting the image data to IPP from CDIC, the image quality processing by IPP and pulse control by VDC are performed, and a visible image (toner image) is formed on the transfer paper in the image forming unit 5.

In the flow of the image data, the parallel bus Pb and the bus control by CDIC realize the compound function of the digital copy machine. In the facsimile transmitting function which is one of the copy functions, the read image data obtained by the scanner 200 is subjected to image processing by IPP, and the reading image data is transmitted to a facsimile control unit (hereinafter, abbreviated as FCU) via CDIC and the parallel bus Pb. Data conversion to the public line communications network (hereinafter abbreviated as PN) is performed by FCU, and the image data is transmitted to PN as facsimile data. In facsimile reception, line data from PN is converted into image data by FCU, and is transmitted to IPP via the parallel bus Pb and CDIC.

In this case, any special image quality processing is not performed, but dot rearrangement and pulse control are performed in VDC, and a visible image is formed on a transfer paper in the image forming unit 5.

When a plurality of jobs, for example, a copy function, a facsimile transceiver function and a printer output function are executed concurrently, assignment of a right to use the reading unit 4, the image forming unit 5 and the parallel bus Pb to the jobs are controlled by the system controller 6 and the process controller 1. The process controller 1 controls the flow of the image data. A system controller controls the whole system and manages activation of each resource. The function of the compound function digital copy machine is selected through the operation board OPB, and the contents of processing, such as a copy function and a facsimile function, are set up.

Figure 5:
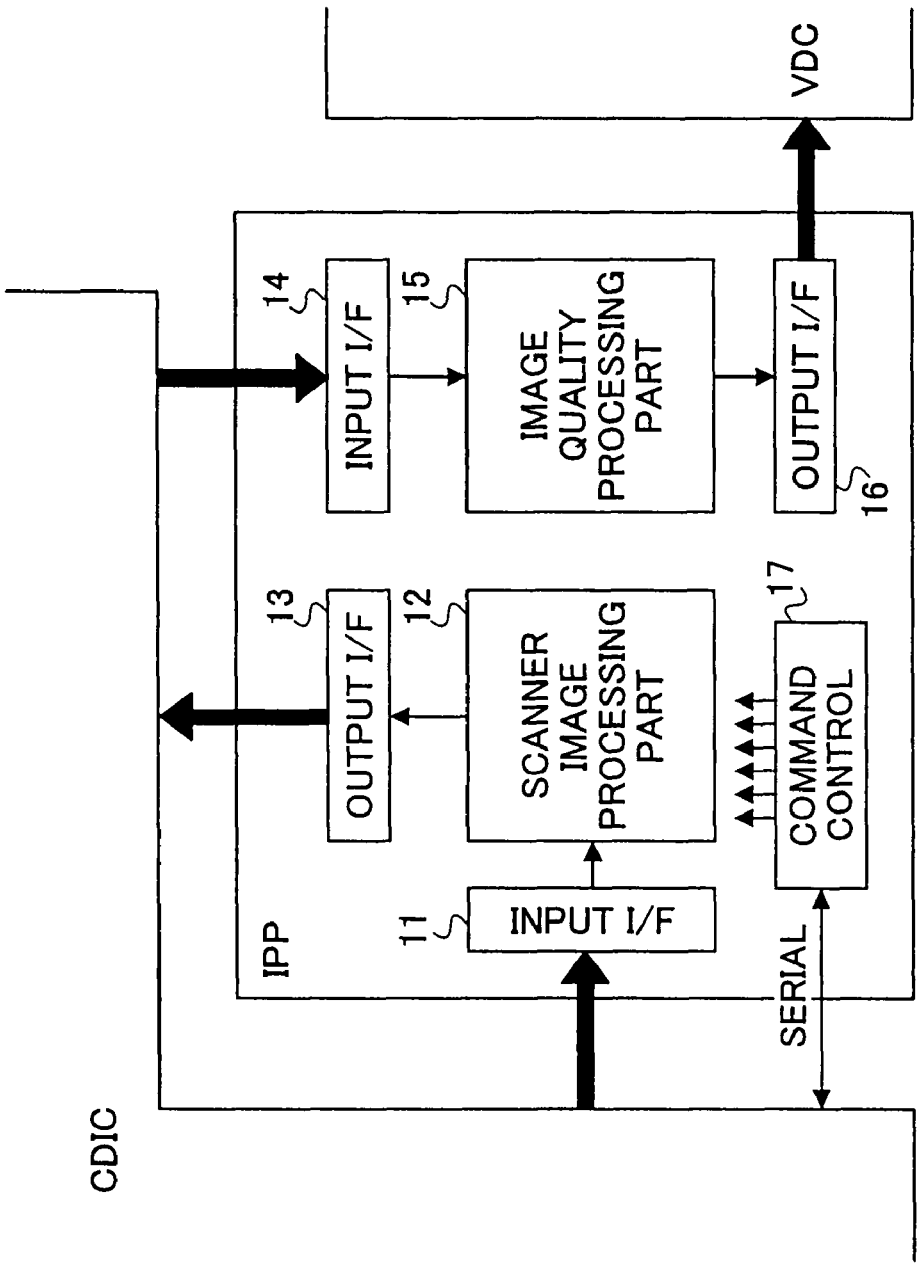
FIG. 5 is a block diagram showing an outline of the image processing function of IPP.

FIG. 5 is a block diagram showing an outline of the image processing function of IPP. The read image data is transmitted to the scanner image processing part 12 from an input I/F (interface) 11 of IPP through SBU to CDIC. Setting a correction of degradation of the image information by reading as a main purpose, a shading correction, a scanner gamma correction, an MTF correction, etc. are performed in the scanner image processing part 12. In the scanner image processing part 12, size change processing of enlargement/reduction is also performed in addition to the correction processing.

After the completion of the correction processing of read image data, the corrected image data is transmitted to CDIC through an output I/F 13. Upon reception of the image data from CDIC through an input 1/F 14, area gradation processing is performed in the image quality processing part 15. The data after the image quality image processing is output to VDC through output I/F 16. The area gradation processing includes concentration conversion, Dither processing, error diffusion processing, etc., and main processing thereof is area approximation of gradation information.

If the image data which has been subjected to the scanner image processing part 12 is accumulated in the memory MEM, various reproduced images can be checked by changing the processing performed by the image quality processing part 15. For example, the atmosphere of a reproduced image can be changed by changing the concentration of a reproduced image or changing the number of lines of a dither matrix. It is not necessary to reread the same image by the scanner 200 for each time to change the processing, and different processing can be performed any number of times by reading the image data stored in the memory MEM.

Figure 6:
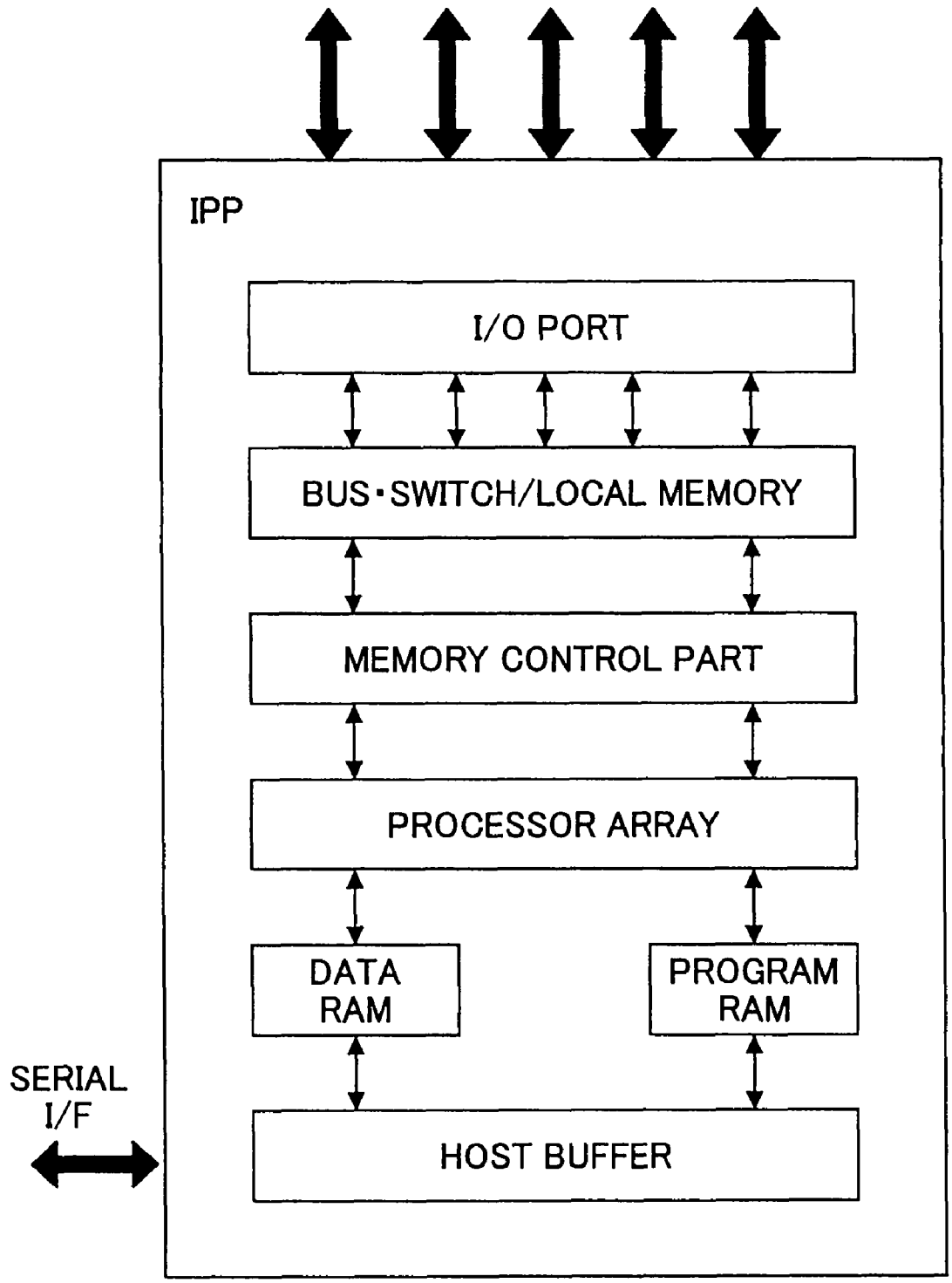
FIG. 6 is a block diagram showing an outline of the internal composition of IPP.

FIG. 6 is a block diagram showing an outline of the internal composition of IPP. IPP has a plurality of I/O boards related with data input and output with the exterior, and can arbitrarily set up an input and an output, respectively. IPP has a local memory group in inside thereof, and controls a memory area to be used and a route of a data path in a memory control part.

Input data and output data are stored in the local memory group assigned as a buffer memory, and control I/F with the exterior. In a processor array part, various kinds of processing are performed for the image data stored in a local memory, and a result of output is again stored in the local memory. Parameters for the processing procedure of a processor are exchanged between a program RAM and a data RAM. The contents of the program RAM and the data RAM are downloaded from a process controller through the serial I/F. Otherwise, the process controller reads the contents of the data RAM and monitors progress of the processing. When the contents of the processing are changed or the processing form required by the system is changed, the contents of the program RAM and the data RAM, which are referred to by the processor array, are updated.

Figure 7:
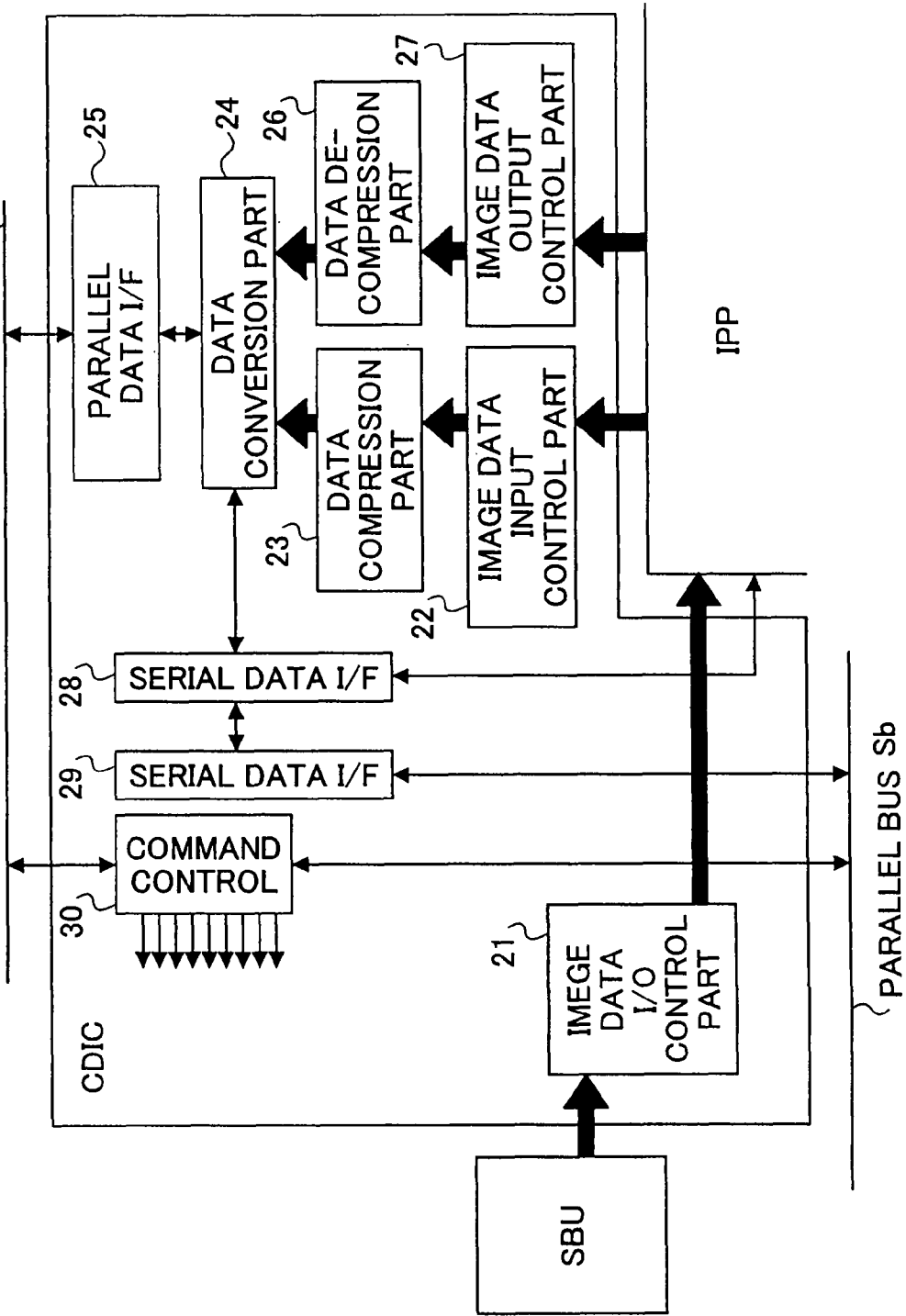
FIG. 7 is a block diagram showing an outline of the functional composition of CDIC.

FIG. 7 is a block diagram showing an outline of the functional composition of CDIC. The image data input-and-output control part 21 inputs the read image data from SBU, and outputs data to IPP. The image data which has been subjected to a scanner image correction by the scanner-image processing part 12 of IPP is supplied to the image data input control part 22. In order to raise the transmission efficiency of the input data in the parallel bus Pb, a data compression is performed in a data compression part 23. The compressed image data is sent through a parallel data I/F 25 to the parallel bus Pb. The image data input through the parallel data I/F 25 from the parallel data bus Pb is compressed for bus transmission, and is elongated by a data extension part 26. The elongated image data is transmitted to IPP by an image data output control part 27. CDIC has a conversion function between parallel data and serial data. The system controller 6 transmits data to the parallel bus Pb, and the process controller 1 transmits data to the serial bus Sb. Parallel/serial data conversion is performed by a data conversion part 24 and a serial data I/F 29 for communication of two controllers 6 and 1. A serial data I/F 28 is provided for IPP, and performs serial data transmission with IPP.

Figure 8:
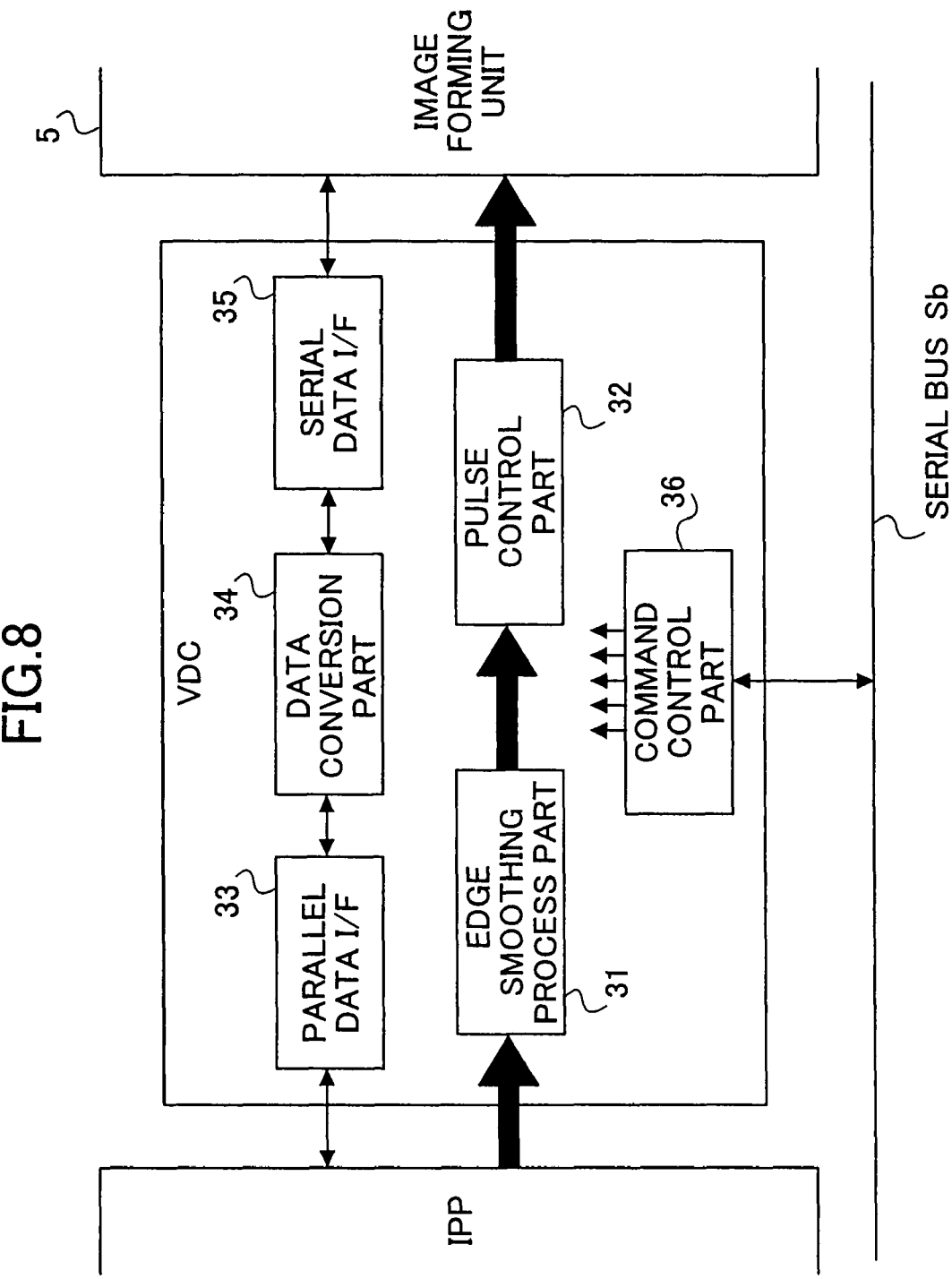
FIG. 8 is a block diagram showing an outline of the functional composition of VDC.

FIG. 8 is a block diagram showing an outline of the functional composition of VDC. VDC applies additional processes to the image data input form IPP in accordance with the characteristic of the image forming unit 5. VDC performs a pulse control of the image signal for rearrangement processing of the dot by an edge smoothing process and dot formation. Image data is output for the image forming unit 5. Besides the conversion of image data, VDC has the format conversion functions 33-35 for parallel data and serial data, and VDC alone can also respond to communication of the system controller 6 and the process controller 1.

Figure 9:
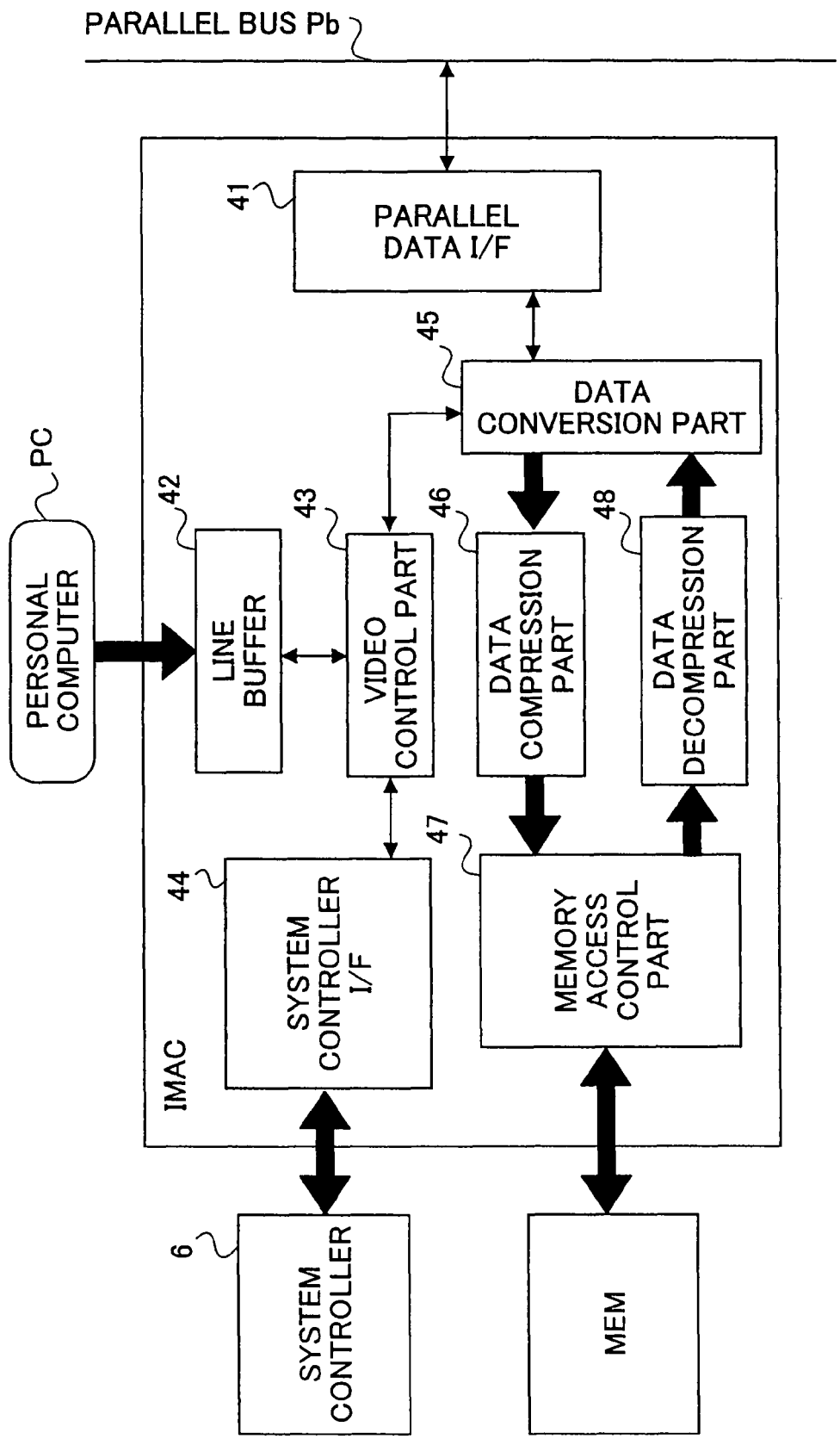
FIG. 9 is a block diagram showing an outline of the functional composition of IMAC.

FIG. 9 is a block diagram showing an outline of the functional composition of IMAC. In a parallel data I/F 41, input and output of the image data to the parallel bus Pb are managed, and storage/reading of image data in the memory MEM and development of code data mainly input from an external PC to image data is controlled. The code data input from PC is stored in a line buffer 42. That is, storage of data in a local area is performed, and the code data stored in the line buffer is developed to image data in a video control part 43 based on based on a deployment processing command input from the system controller 6 via a system controller I/F 44. The developed image data or the image data input from the parallel bus Pb through the parallel data I/F 41 is stored in the memory MEM. In this case, the image data, which serves as a candidate to be stored, is selected by a data conversion part 45. Then, a data compression is performed in a data compression part 46 so as to raise an efficiency of memory use, and the image data is stored in the memory MEM while managing addresses of the memory MEM by a memory access control part 47. Reading of the image data stored in MEM is performed based on a readout address controlled by the memory access control part 47. The read image data is decompressed by a data decompression part 48. When transmitting the decompressed image data to the parallel bus Pb, the data transmission is performed through the parallel data I/F 41.

Figure 10:
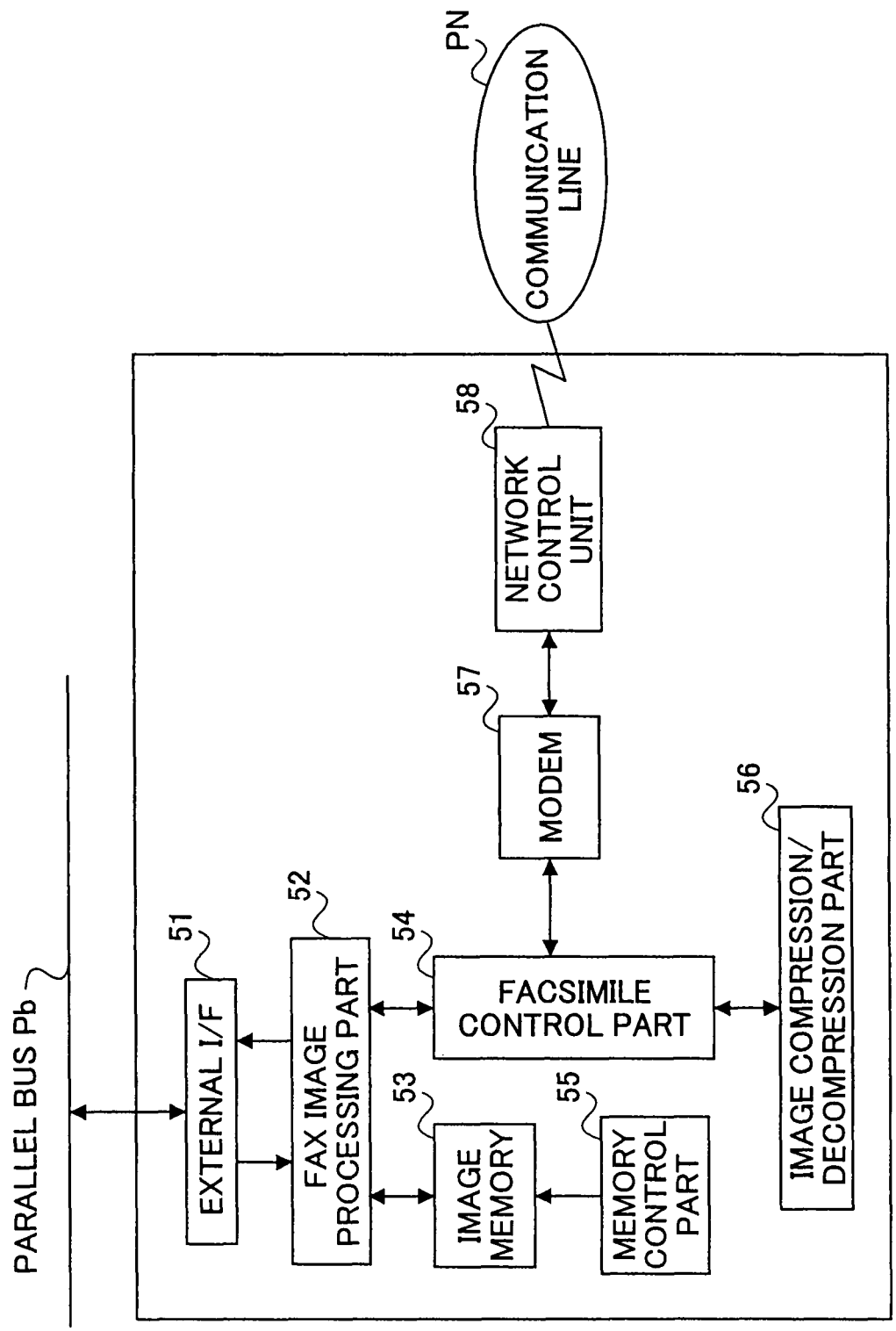
FIG. 10 is a block diagram showing an outline of the functional composition of FCU.

FIG. 10 is a block diagram showing an outline of the functional composition of FCU. The facsimile transceiver part FCU changes image data into communication form, and transmits to the external line PN. Moreover, FCU restores data from the external circuit PN to image data, and carries out a record output by the image forming unit 5 through an external I/F 51 and the parallel bus Pb. The facsimile transceiver part FCU comprises a facsimile image processing part 52, an image memory 53, a memory control part 55, a facsimile control part 54, an image compression/decompression part 56, a modem 57 and a network control unit 58. Among these parts, a binary value smoothing processing is performed in the edge smoothing processing 31 of VDC with respect to the facsimile image processing performed by the facsimile image processing part 52. Moreover, with respect to the image memory 53, a part of an output buffer function is compensated by IMAC and MEM.

In the thus-constituted facsimile transceiver part FCU, when starting transmission of image information, the facsimile control part 54 sends an instruction to the memory control part 55 so as to sequentially read the picture information accumulated in the picture memory 53. The read picture information is restored to the original signal, and density conversion processing and size change processing are made, and the read picture information is supplied to the facsimile control part 54. The image signal supplied to the facsimile control part 54 is encoded and compressed by the image compression/decompression part 56. The compressed image signal is sent to a destination address through the network control unit 58, after becoming modulated by the modem 57. The image information of which transmission is completed is deleted from the picture memory 53.

At the time of reception, a received image is once accumulated in the image memory 53. If a record output of the received image is possible, the received image is output when an image corresponding to one sheet is completed. Moreover, when a call is received during a copy operation and reception of image data is started, the received image data is accumulated in the image memory 53 until the rate of use of the image memory 53 reaches a predetermined value, for example, 80%. When the rate of use of the image memory 53 reaches 80%, a write-in operation currently performed is interrupted compulsorily, and the received image data is read from the image memory 53 so as to output the image data by recording. The received image data read from the image memory 53 at this time is deleted from the image memory 53. Then, the interrupted write-in operation is resumed when the rate of use of the picture memory 53 fell to a predetermined value, for example, 10%. Thereafter, when the whole of the write-in operation is ended, the record output of the remaining received image is carried out. Additionally, after interrupting the write-in operation, various parameters for the write-in operation at the time of interruption are internally evacuated so that the write-in operation can be resumed by internally returning the parameters at the time of resumption.

In the above-mentioned example, CDIC which is a picture bus management means and IMAC which is a memory management means are connected by the parallel bus Pb which includes one set of image buses. SBU as image reading means, VDC as write-in means and IPP as image signal processing means are not connected to the image bus Pb directly but connected to the image bus management means CDIC. For this reason, the use management of the image bus Pb is performed only by the image bus management means CDIC and the memory management means IMAC. Therefore, an arbitration and a transmission control of the bus Pb are easy and efficient.

Figure 11A:
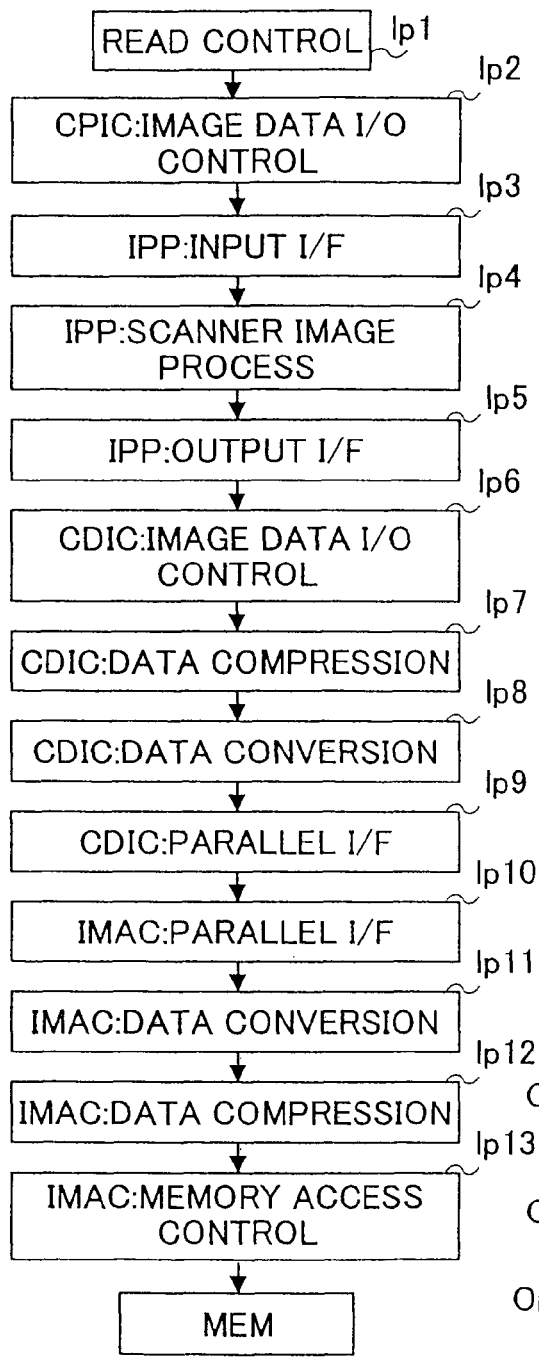
FIG. 11A is a flowchart of a process of accumulating image data in MEM.
Figure 11B:
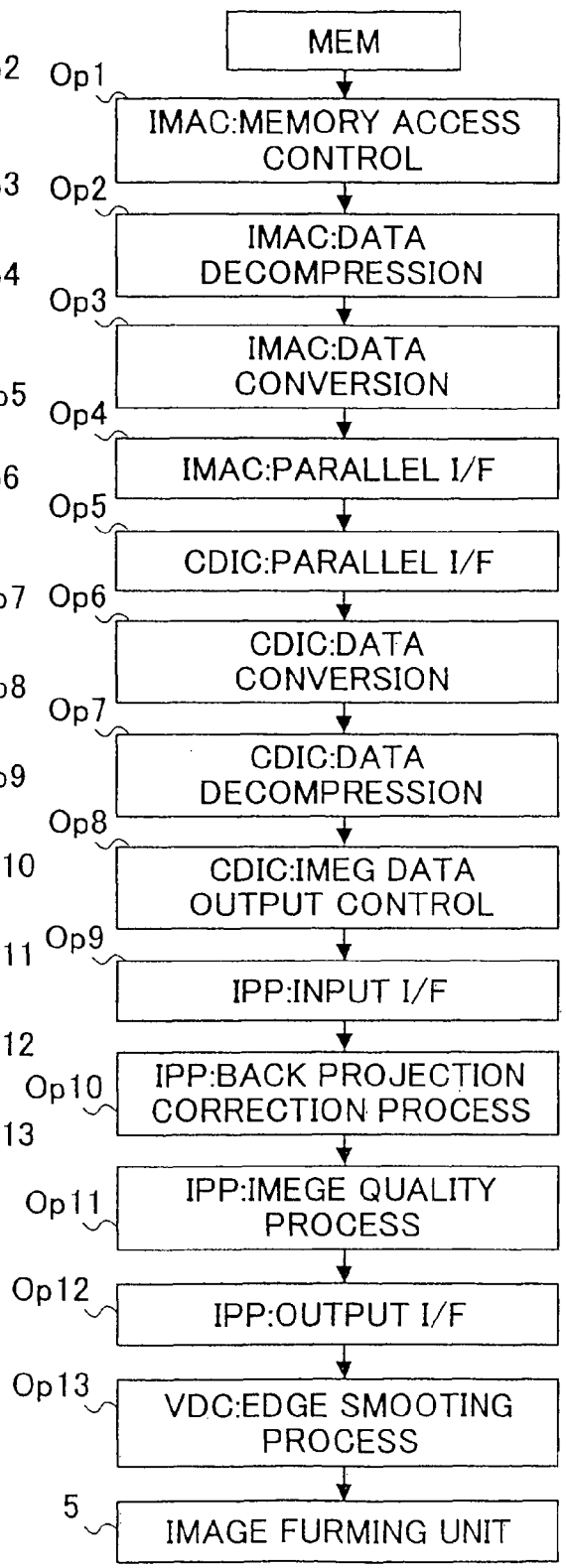
FIG. 11B is a flowchart of a process of reading the image data from MEM.

FIG. 11A is a flowchart of a process of accumulating image data in MEM, and FIG. 11B is a flowchart of a process of reading the image data from MEM. FIG. 11A shows the process (steps Ip1-Ip13) applied to the image data until the image data, which is generated by the image scanner 200, is written in MEM.

FIG. 11B shows the process (steps Op1-Op13) applied to the image from reading the image data from MEM and until the image data is output to the printer 400. The data flow between such a bus and a unit is controlled by a control of CDIC. With respect to the read image data, the scanner image processing Ip1-Ip13 (12 of FIG. 5) is independently performed, and with respect to the image data to be output to the printer 400, the image quality processing Op1-Op13 (15 of FIG. 5) by IPP is independently performed.

Figure 12:
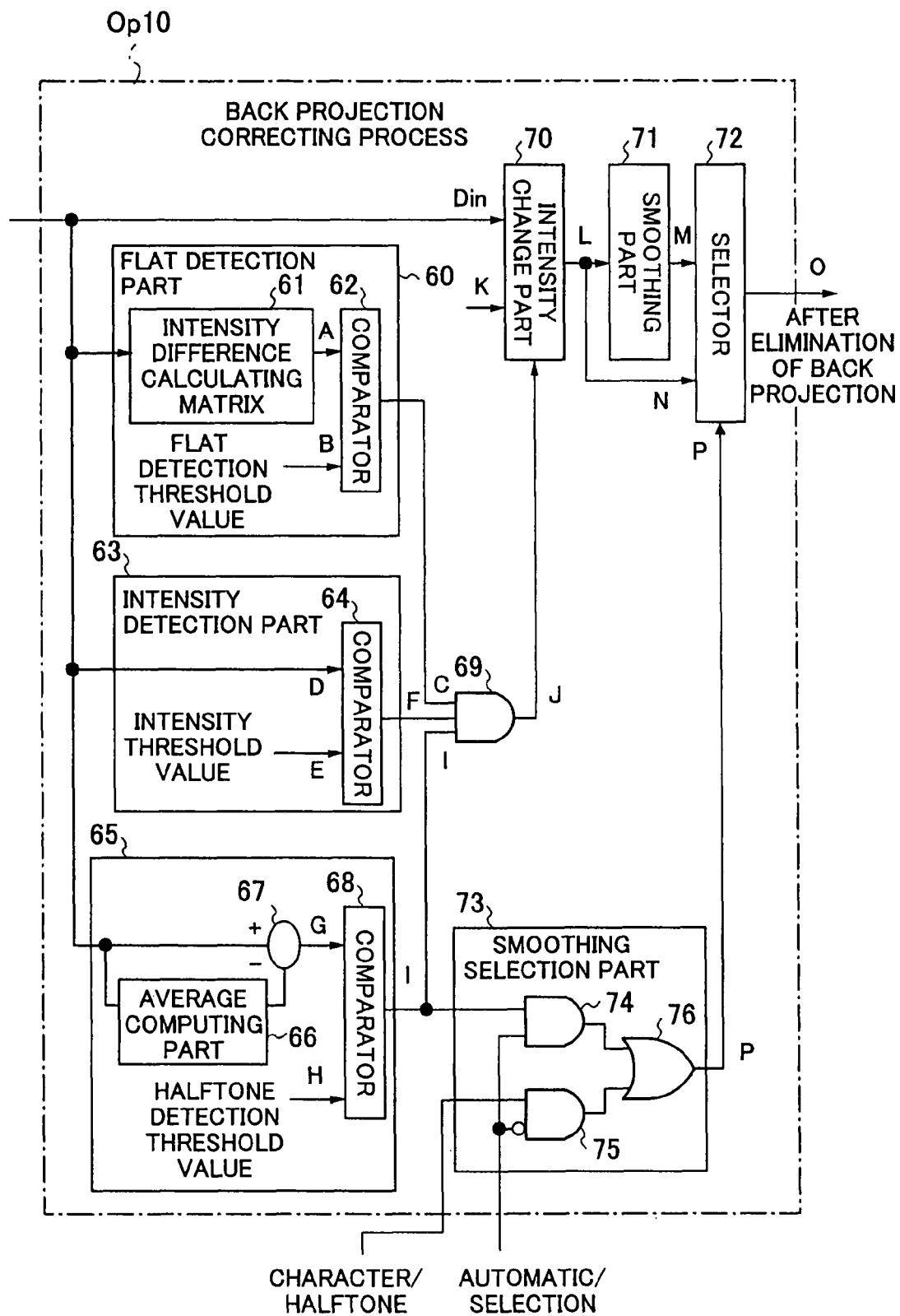
FIG. 12 is a block diagram showing a functional composition to perform a back projection correcting process of step Op10.

In the present embodiment, the "reverse side projection correcting process" of step Op10 in FIG. 11B is performed in the process of steps Op1-Op13 in which the image data is read from MEM and is output to the printer 400. FIG. 12 is a block diagram showing a functional composition to perform the reverse side projection correcting process of step Op10. The image data of each pixel is written in an intensity difference detecting matrix 61 of a flat detection 60, which is a 3×3-pixel matrix having an attention pixel (intensity value e) in the center to which the pixel data Din currently being supplied is provided. If the intensity values represented by the image data are made into a-i as shown in FIG. 13A, the flat detection 60 computes the intensity differences A (A1-A8) within the pixel matrix 61 as shown in FIG. 13B. Then, a comparator 62 checks whether each of the computed intensity values is smaller than a flat detection threshold value B. If the intensity differences (all of A1-A8) are smaller than the threshold value B, a flat detection signal C is set to a high level 1 which represents flatness. If any one of the intensity differences is equal to or greater than the threshold value B, the flat detection signal C is cleared to a low level 0 which represents non-flatness. The flat detection signal C is one of the inputs of a logical product operator 69.

Figure 1A:
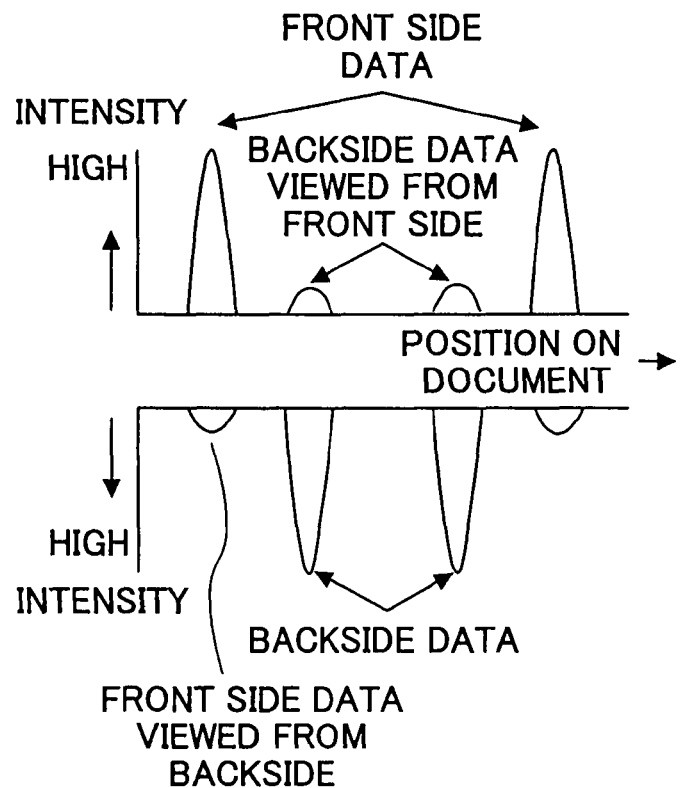
FIG. 1A is a graph showing an intensity of images on a front side and a backside of a document.
Figure 1B:
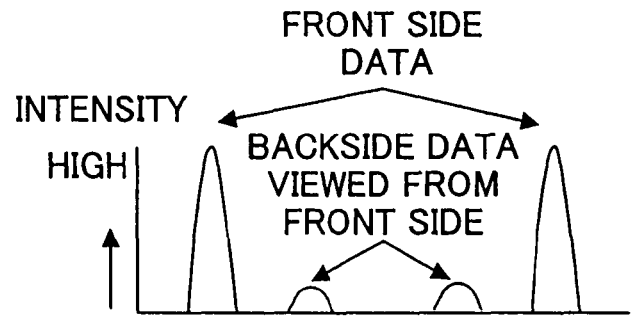
FIG. 1B is a part of the graph of FIG. 1A showing an intensity of images on the front side.
Figure 2A:
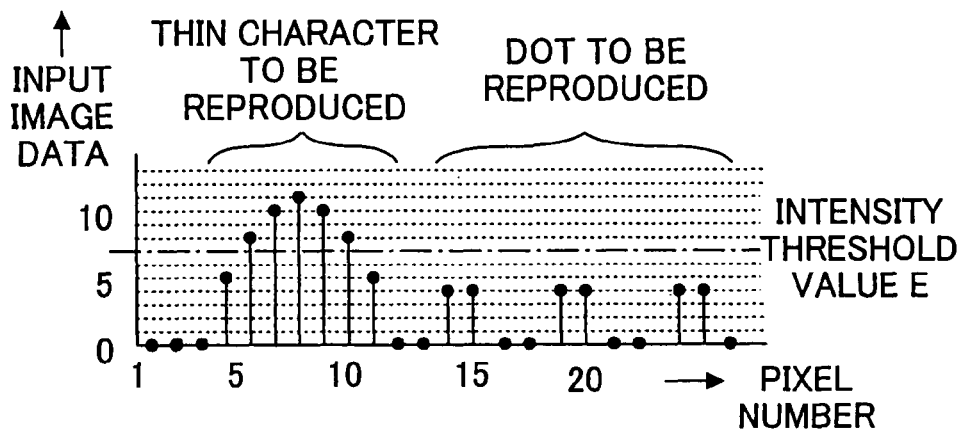
FIG. 2A is a graph showing an example of image data including data corresponding to a halftone image.
Figure 2B:
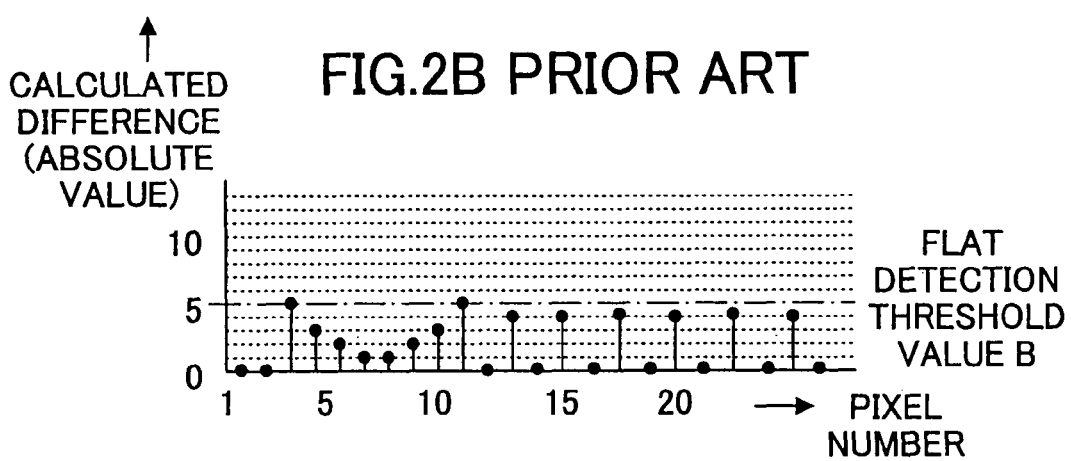
FIG. 2B is a graph showing an intensity difference calculated based on the image data shown in FIG. 1A.

When the image data includes data representing dots of a halftone image as shown in FIG. 2A, the intensity difference A and the threshold value B have a relative relationship as shown in FIG. 2B.

Figure 15A:
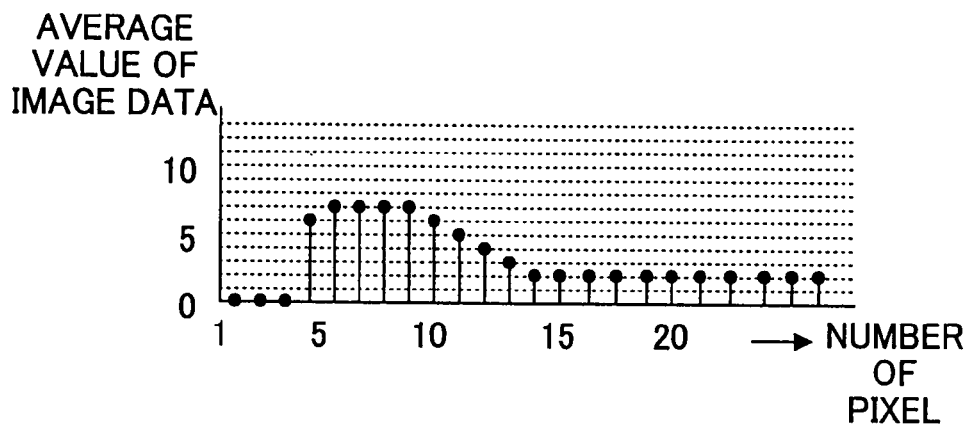
FIG. 15A is a graph showing an average value of intensity levels indicated by image data when the image data is that shown in FIG. 2A.

In an intensity detection part 63, a comparator 64 checks whether or not an intensity value e=D of an attention pixel is smaller than the threshold value E for low-intensity detection. When the intensity value e=D is smaller than the threshold value E, a low intensity detection signal F is set to a high level 1, which represents that the intensity of the attention pixel is low. When the intensity value e=D is equal to or greater than the threshold value E, a low intensity detection signal F is cleared to a low level 0, which represents that the intensity of the attention pixel is not low. The low intensity detection signal F is one of the inputs of the logical product operator 69. FIG. 15C is a graph showing the level of the threshold value E and intensity levels of the image data shown in FIG. 2A.

In a halftone detection part 65, an average computing part 66 computes the average value of the image data which consists of 8 pixels containing the attention pixel and seven pixels adjacent to the attention pixel. Namely, as shown in FIG. 14A, each pixel data of the eight pixels is multiplied by the same factor 1, and the product is divided by 8 (remove the lower three bits). This process is equivalent to a one-dimensional smoothing filter process. FIG. 15A is a graph showing the average value of intensity levels indicated by image data when the image data is that shown in FIG. 2A.

In the halftone detection part 65, a difference value G, which is obtained by subtracting the average value from the intensity value indicated by the image data of the attention pixel, is compared with a threshold value H for halftone detection by a comparator 68. When the difference value G is smaller than the threshold value H, a non-halftone detection signal I is set to a high level 1, which represents that the attention pixel does not correspond to a dot of a halftone image. When the difference value G is equal to or greater than the threshold value H, the non-halftone detection signal I is cleared to a low level 0, which represents that the attention pixel corresponds to a dot of a halftone image. The non-halftone detection signal I is also one of the inputs of the logical product operator 69.

Figure 15B:
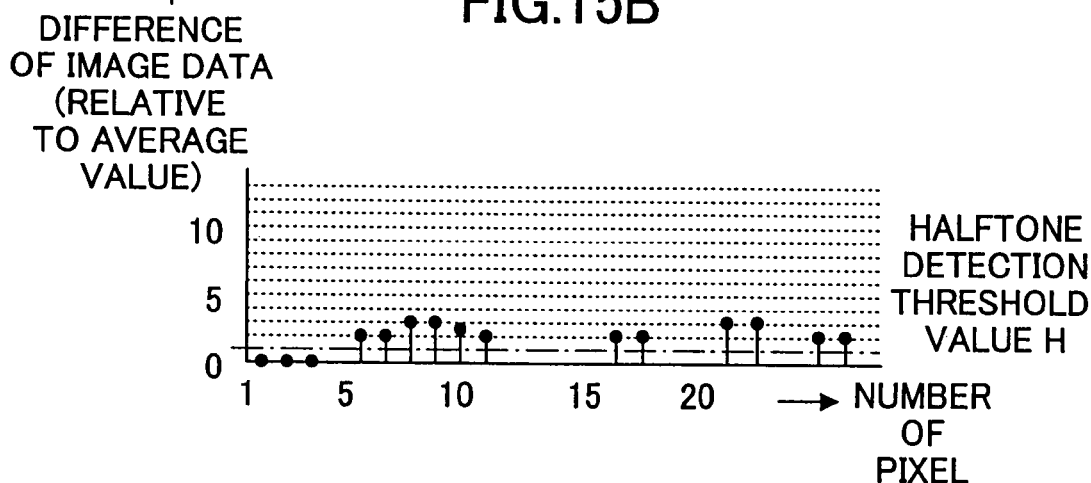
FIG. 15B is a graph showing a relationship between a threshold value and a difference value obtained by subtracting an average value from an intensity value when the image data is that shown in FIG. 2A and an average value of intensity levels represented by the image data is that shown in FIG. 15A.
Figure 15C:
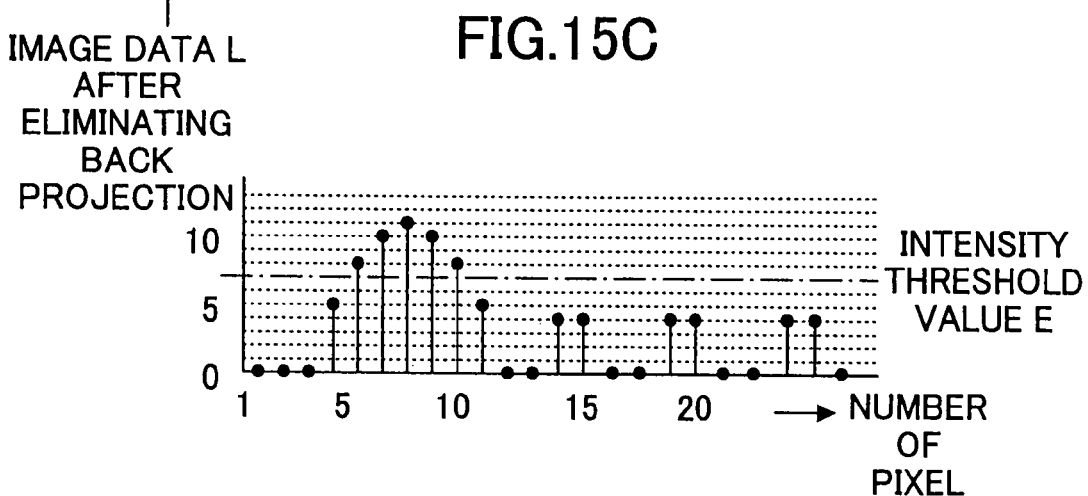
FIG. 15C is a graph showing a level of a threshold value and intensity levels of the image data shown in FIG. 2A.

FIG. 15B is a graph showing a relationship between the threshold value and the difference value G obtained by subtracting the average value from the intensity value when the image data is that shown in FIG. 2A and the average value of the intensity levels represented by the image data is that shown in FIG. 15A. An output J of the logical product operator 69 becomes the high level 1, when three signals, that are the flat detection signal C, the low intensity detection signal F and the non-halftone detection signal I are at the high level 1. That is, when an image intensity distribution is flat, and the image intensity of an attention pixel is low and does not correspond to a dot of a halftone image, it can be regarded as back projection. The output J of the logical product operator 69 at this time becomes the high level 1, which represent that the attention pixel corresponds to back projection.

The image data of an attention pixel is given to an intensity change part 70. When the output J of the logical product operator 69 is at the high level which represents the back projection, the intensity change part 70 changes the image data of the attention pixel to a predetermined low level K corresponding to a background level, and the image data is output from the intensity change part 70 as an output L. When the output J of the logical product operator 69 is at the low level 0 (non-back projection), the intensity change part 70 outputs the image data of the attention pixel as the output L without applying the change.

Figure 2C:
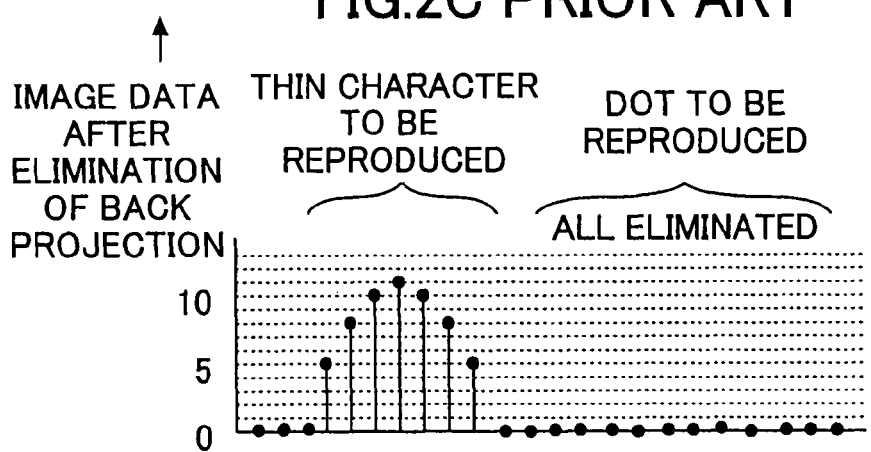
FIG. 2C is a graph showing the image data after elimination of a back projection image.

When the image data is that shown in FIG. 2A, and if a logical product of the detection output C of the flat detection part 60 and the detection output F of the intensity detection part 63 is given to the intensity change part so as to select one of the original image data Din and the background level setting value K in accordance with the level of the output L of the intensity change part 70, the output L of the intensity change part 70 may eliminate a low intensity dot as shown in FIG. 2C. However, in the present embodiment, since the non-halftone detection signal I of the halftone detection part 65 is set as one of the inputs of the logical product operator 69, when the image data is that shown in FIG. 2A, the output L of the intensity change part 70 becomes what leaves a low intensity dot as it is as shown in FIG. 15C, thereby achieving a high reliability of the back projection correcting process.

The image data L output by the intensity change part 70 outputs is given to a smoothing part 71 and an output selector 72. The smoothing part 71 applies a smoothing filter process to the image data L using a filter coefficient shown in FIG. 14B. According to the pixel matrix distribution of the filter coefficient shown in FIG. 14B, a high weight is given to an attention pixel. Moreover, a next high weight is given to the maximum proximity pixels having a side contacting the attention pixel. Furthermore, a low weight is given to the proximity pixels having a corner contacting the attention pixel. Therefore, the smoothing part 71 computes the weighted average value of the image data of a small area having the attention pixel at the center, and, therefore, the intensity level of the circumference pixel is reflected in the intensity level M of the attention pixel.

The output I of the halftone detection part 65 is also given to the smoothing selection part 73. An automatic/selection signal, which represents whether an automatic or a selection is designated through the operation part OPB, and a character/halftone signal, which represent whether a character or a halftone is designated, are also given to the smoothing selection part 73. A high level 1 of the 1-bit automatic/selection signal indicates that the "automatic" is designated, and a low level 0 indicates that the "selection" is designated. A high level 1 of the 1-bit character/halftone signal indicates that the "character" is designated, and a low level 0 indicates that the "halftone" is designated. A description will be given later, with reference to FIG. 16, of the setting of the automatic/selection signal and the character/halftone signal.

When the automatic/selection signal is at the high level 1 which designates the "automatic", an AND gate 74 is turned on, an AND gate 75 is turned off and the non-halftone detection signal I of the non-halftone detection part 65 is given to the selector 72 via an OR gate 76. The selector 72 selects the smoothed image data M as an output of the back projection correcting process (step Op10) when the non-halftone detection signal I is at the high level 1, which represents that the attention pixel does not correspond to a dot of a halftone image. On the other hand, the selector 72 selects the non-smoothed image data L=N as an output of the back projection correcting process (step Op10) when the non-halftone detection signal I is at the low level 0, which represents that the attention pixel corresponds to a dot of a halftone image.

When the automatic/selection signal is at the low level 0 which designates the "election", the AND gate 74 is turned off, the AND gate 75 is turned on and character/halftone signal is given to the selector 72 via the AND gate 75 and the OR gate 76. The selector 72 selects the smoothed image data M as an output of the back projection correcting process (step Op10) when the character/halftone signal is at the high level 1, which represents that the attention pixel correspond to a character image. On the other hand, the selector 72 selects the non-smoothed image data L=N as an output of the back projection correcting process (step Op10) when the character/halftone signal is at the low level 0, which represents that the attention pixel corresponds to a dot of a halftone image.

According to the above-mentioned process, an intensity change is performed based on the result of detection of the flat detection part 60 and the intensity detection part 63 when a halftone image is not detected by the halftone detection part 65, and, thereby, back projection is eliminated.

By applying the smoothing process by the smoothing part 71 to the output L of the intensity change part 70, an intensity discontinuous part after the intensity change is equalized, thereby improving the image quality. However, if the smoothing process is applied to data corresponding to the low intensity halftone portion, the data is blunted and an intensity fall is caused. In the worst case, the data may be eliminated. Therefore, in the present embodiment, whether to render the output 0 to be the smoothed data M or non-smoothed data L=N is changed by the selector 72. The smoothing selection part 73 selects the non-smoothed data for a halftone image so as to avoid an unnecessary intensity fall. When "automatic" is designated, the smoothing selection part 73 automatically switches the selector according to the detection result I of the halftone detection part 65. Therefore, the present embodiment can cope with a case where a low intensity halftone image and other images are present in the same original image. If an operator does not wish to apply the smoothing process, the operator may designate both "selection" and "halftone". In such as case, the smoothing selection part 73 sets the selector 72 to select the image data L=N as the output 0. If the operator wishes to apply the smoothing process, the operator may designate both "selection" and "character". In such as case, the smoothing selection part 73 sets the selector 72 to select the smoothed image data M as the output 0.

Figure 16:
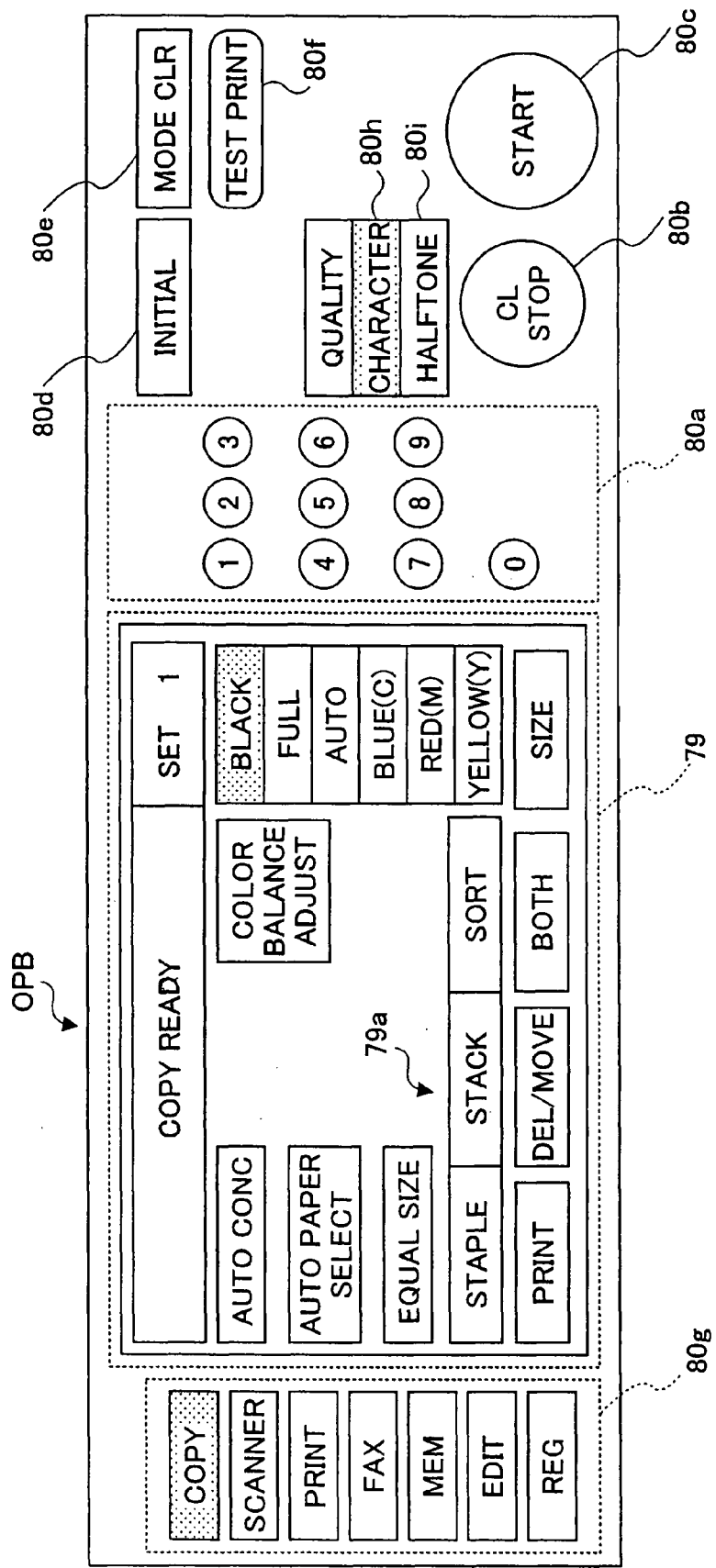
FIG. 16 is a plan view of an operation part of the copy machine shown in FIG. 3.

As shown in FIG. 16, the operation part OPB is provided with a liquid crystal touch panel 79, a ten-key pad 80a, a clear/stop key 60b, a start key 60c, a mode clear key 60e, a test print key 80f and a function selection key 80g for selecting a copy function, a scanner function, a print function, a facsimile function, an accumulation function, an edit function, a registration function and other functions and indicating a state of execution of these functions. An input/output screen, which corresponds to a function designated through the function selection key 80g, is displayed on the liquid crystal touch panel 79. For example, when the copy function is designated, a message, which shows the state of function key 79a, a number of copies and a state of the image forming apparatus, is displayed. The test print key 80f is a key for printing only one set of print irrespective of the number of sets of print, which has been set, so as to check the result of print.

A character designation key 80h is operated when an operator regards an original image as a binary image such as a text or a line drawing. A halftone designation key 80i is operated when an operator regards an original image as a halftone image or a gray scale image such as a photograph or a picture. When the "character" is designated, data (1-bit signal), which represents the designation, is set to a high level 1. When the "halftone" is designated, the data (1-bit signal), which represents the designation, is set to a low level 0. When the "character" is designated, IPP applies a process to the image data so as to clearly display characters and lines. When the "halftone" is designated, IPP applies a process to the image data so as to smoothly display a gradation image such as a photograph.

Moreover, when an initial-setting key 80d is operated, a selection menu is displayed for selecting an "initial value setting" function for setting up various initial values, an "ID setting" function, a "copyright registration/setting" function and an "output of operation history" function. The "initial value setup" includes a setup of the "automatic/selection."

The "automatic/selection" is set whether to select automatically whether or not the smoothing process of the smoothing part 71 be applied to the image data, which has passed through the intensity change part for the back projection correction or designation by the character designation key 80h by an operator or by the halftone designation key 80i, that is whether to select according to a selection made by the operator. The data (1-bit signal) representing the setting is at a high level 1 when the "automatic" is set, and is at a low level 0 when the "selection" is set.

Figure 17:
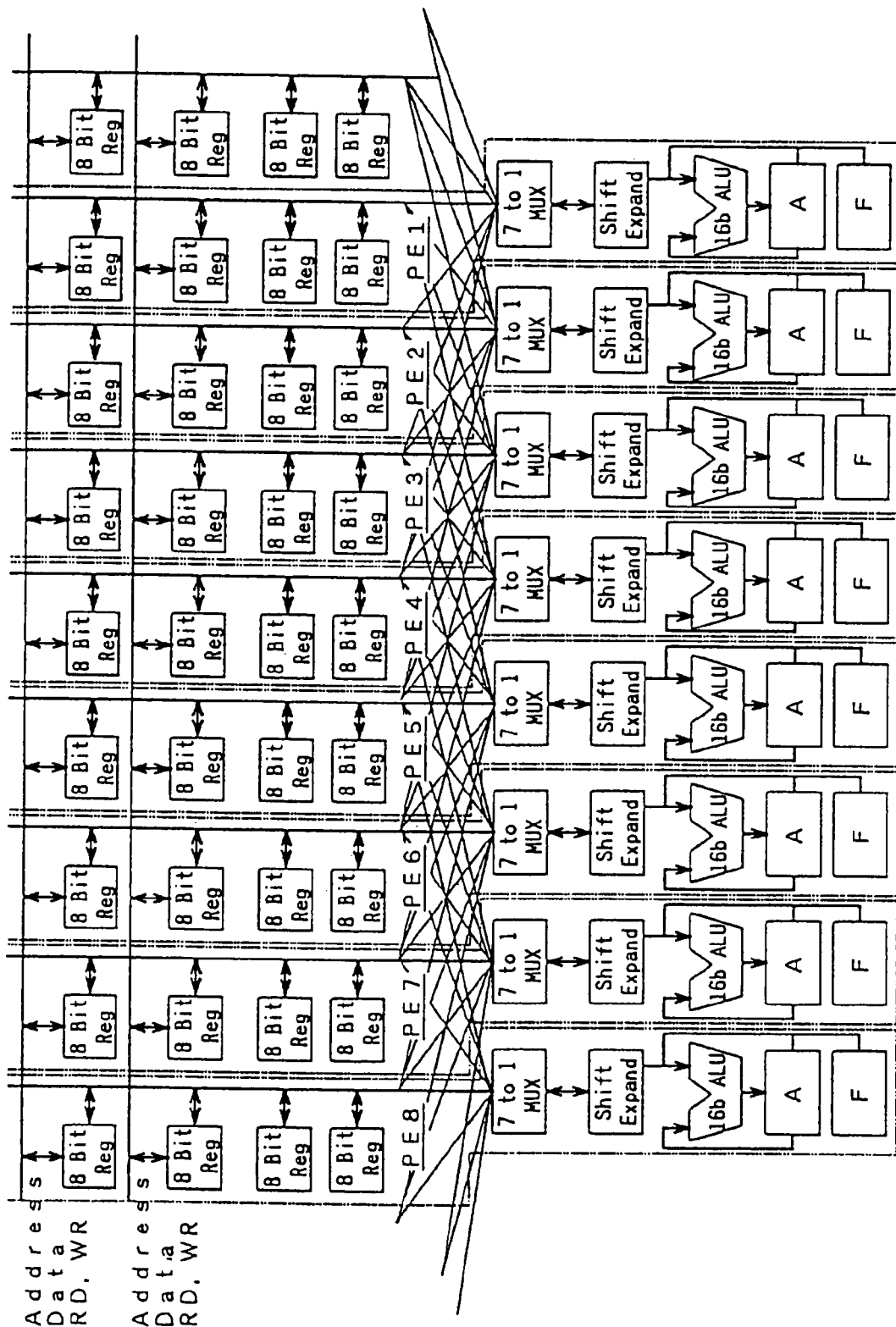
FIG. 17 is a block diagram of a part of a processor array shown in FIG. 6.

FIG. 17 is a block diagram showing an outline composition of a SIMD type processor for image processing adopted in IPP. A SIMD type processor is a processor, which executes a single command with respect to a plurality of sets of data. In the present embodiment, the processor comprises a plurality of processor elements PE1-PE8 (8 processors for 1 byte parallel processing). Each of the processor elements PE1-PE8 comprises a register (Reg) for storing data, a multiplexer (MUX) for accessing the register (Reg) of other PE, a barrel shifter (ShiftExpand), a logic operation unit (ALU), an accumulator (A) which stores a result of operation and a temporary register (F) that temporarily evacuates the contents of the accumulator (A). Each register is connected to an address bus and a data bus, and stores a command code which specifies processing or data to be processed.

The data set as an object to be processed by the register is input to the logic operation unit ALU, and the result of operation is stored in the accumulator A. In order to take out the result of the processor element PE, the result of processing is temporarily evacuated to the temporary register F. Thus, the result of processing of the object data is obtained by taking out the contents of the temporary register F.

A command code is given to each of the processor elements PE1-PE8 with the same contents.

The object data of processing is given in a different state for each of the processor elements PE1-PE8. By referring to the contents of Reg of the adjacent PE by the multiplexer MUX, the operation result is processed in parallel and is output to each accumulator A. For example, if the contents of the image data of one line are arranged to PE for each pixel and operation processing is carried out with the same command code, the processing result for 1 byte can be obtained for a shorter time than a case in which serial processing is carried out on an individual pixel basis. As mentioned above, the image data processing is carried out by the processor elements PE1-PE8 in IPP.

A description will now be given, of another example of the halftone detection process applicable to the above-mentioned back projection correcting process. In this example, detection is made as to whether an image corresponds to a halftone image or other images based on a change in intensity of an edge of the image. A degree of change in intensity of an edge of an image is hereinafter referred to as an edge amount.

As mentioned above, the back projection correcting process is performed by the image quality processing part 15 of IPP shown in FIG. 5. A back projection correction processing part 150 shown in FIG. 18 is provided in the image quality processing part 15. FIG. 18 is a block diagram of the back projection correction processing part 150 which detects a halftone image based on the edge amount. FIGS. 19A, 19B, 19C, and 19D show an example of the image data transmitted to the back projection correction processing part 150. FIG. 19A shows a front-side image 81 extracted from image data of a front side of an original document. FIGS. 19B, 19C and 19D show reverse-side images 82a, 82b, and 82c extracted from image data of a reverse side of the original document.

The front-side image 81 shown in FIG. 19A includes a transmission component (a back projection image) other than the image printed on the front side of the original document. The transmission component is the images printed on the reverse side and appears on the front side due to transmission.

The image 82a shown in FIG. 19B corresponds to a halftone image, the image 82b shown in FIG. 19C corresponds to a character image, and the image 82c shown in FIG. 19D corresponds to a solid or thick image. In FIGS. 19A through 19D, the horizontal axis represents a position and the vertical axis represents an intensity value of the image data.

As shown in FIG. 18, the back projection correction processing part 150 comprises an edge amount detection part 151, a smoothing part 152, a determining part 153 and an intensity correction part 154. The edge amount detection part 151 extracts an edge portion of the transmitted image data. The smoothing part 152 smoothes the result of edge extraction. The determining part 153 distinguishes a back projection image from images printed on the front side of the original document. The intensity correction part 154 performs the elimination of image data corresponding to the back projection image based on the result of determination of the determining part 153.

When image data is transmitted to the back projection correction processing part 150, the edge amount detection part 151 detects the edge amount of the image data. For example, even if it is an acute image on the reverse side, it becomes an image having a dull edge due to transmission to the front side. On the other hand, a printed image having a low contrast, for example, a character portion or a halftone portion has a sharp edge even if an average intensity is low. Accordingly, the image data generated by back projection can be distinguished from the image data generated by the true image on the front side based on the existence of a sharp edge. When detecting the existence of the edge, the image data of the front-side picture 81 shown in FIG. 19A is processed by a Laplacian filter L1 shown in FIG. 20 so as to extract the edge portion 83 of the image on the front side as shown in FIG. 21A. Thereby, the edge portion of a back projection image can be distinguished from the edge portion of a low contrast image.

Thus, when the edge portion 83 is extracted, the inner side of a character may be judged to be a back projection image since the inner side of a character is not judged to be an edge. Then, the smoothing part 152 obtains a smoothed image 84 of the front-side image 81 as shown in FIG. 21B by smoothing the result of edge extraction by the amount detection part 151 by a smoothing filter L2 shown in FIG. 22. The determining part 153 detects a character portion of a low contrast image portion and a halftone portion by binarizing the smoothed image data. Therefore, the halftone detection process according to the above-mentioned edge amount detection is applicable to the halftone detection process performed by the halftone detection part 65 shown in FIG. 12.

The present invention is not limited to the specifically disclosed embodiments, and variations and modifications may be made without departing from the scope of the present invention.

The present application is based on Japanese priority application No. 2000-266591 filed on Sep. 4, 2000, the entire contents of which are hereby incorporated by reference.

What is claimed is:

1. An image data correcting device comprising:
    a detecting part that detects an intensity difference between first image data corresponding to a part of a predetermined small area and second image data corresponding to the remaining parts of the predetermined small area; and
    an intensity changing part that changes an intensity of the first image data to a predetermined low intensity when the intensity difference is equal to or smaller than a first predetermined value and the intensity of the first image data is equal to or smaller than a second predetermined value, and that does not change the intensity of the first image data when either the intensity difference is greater than the first predetermined value or the intensity of the first image data is greater than a second predetermined value.

2. The image data correcting device of claim 1, wherein the predetermined small area is defined by a pixel matrix, and the first image data corresponds to one of pixels located in the center of the pixel matrix.

3. The image data correcting device of claim 1, wherein the predetermined low intensity is equal to or less than an intensity of a background of an image from which the predetermined small area is extracted.

4. An image data correcting device comprising:
 a detecting part that detects an intensity difference between first image data corresponding to a part of a predetermined small area and second image data corresponding to the remaining parts of the predetermined small area;
 a determining part that determines whether the first image data corresponds to a halftone image; and
 an intensity changing part that changes an intensity of the first image data to a predetermined low intensity when the intensity difference is equal to or smaller than a first predetermined value and the first image data does not correspond to the halftone image and the intensity of the first image data is equal to or smaller than a second predetermined value, and does not change the intensity of the first image data when the intensity difference is greater than the first predetermined value or the first image data does correspond to the halftone image or the intensity of the first image data is greater than the second predetermined value.

5. The image data correcting device of claim 4, wherein the predetermined small area is defined by a pixel matrix, and the first image data corresponds to one of pixels located in the center of the pixel matrix.

6. The image data correcting device of claim 4, wherein the predetermined low intensity is equal to or less than an intensity of a background of an image from which the predetermined small area is extracted.

7. A method for correcting image data, the method comprising:
 detecting an intensity difference between first image data corresponding to a part of a predetermined small area and second image data corresponding to the remaining parts of the predetermined small area;
 changing an intensity of the first image data to a predetermined low intensity when the intensity difference is equal to or smaller than a first predetermined value and the intensity of the first image data is equal to or smaller than a second predetermined value; and
 not changing the intensity of the first image data when either the intensity difference is greater than the first predetermined value or the intensity of the first image data is greater than the second predetermined value.

8. The method of claim 7, wherein the predetermined small area is defined by a pixel matrix, and the first image data corresponds to one of pixels located in the center of the pixel matrix.

9. The method of claim 7, wherein the predetermined low intensity is equal to or less than an intensity of a background of an image from which the predetermined small area is extracted.

10. A method for correcting image data, the method comprising:
 detecting an intensity difference between first image data corresponding to a part of a predetermined small area and second image data corresponding to the remaining parts of the predetermined small area;
 determining whether the first image data corresponds to a halftone image;
 changing an intensity of the first image data to a predetermined low intensity based on a determination that the intensity difference is equal to or smaller than a first predetermined value and the first image data does not correspond to the halftone image and the intensity of the first image data is equal to or smaller than a second predetermined value, and
 not changing the intensity of the first image data when the intensity difference is greater than the first predetermined value or the first image data does correspond to the halftone image or the intensity of the first image data is greater than the second predetermined value.

11. The method of claim 10, wherein the predetermined small area is defined by a pixel matrix, and the first image data corresponds to one of pixels located in the center of the pixel matrix.

12. The method of claim 10, wherein the predetermined low intensity is equal to the intensity of the background of the image from which the predetermined small area is extracted.

* * * * *